United States Patent [19]
Silverman

[11] Patent Number: 6,128,124
[45] Date of Patent: Oct. 3, 2000

[54] ADDITIVE COLOR ELECTRIC PAPER WITHOUT REGISTRATION OR ALIGNMENT OF INDIVIDUAL ELEMENTS

[75] Inventor: Alexander E. Silverman, Menlo Park, Calif.

[73] Assignee: Xerox Corporation, Stanford, Conn.

[21] Appl. No.: 09/173,964

[22] Filed: Oct. 16, 1998

[51] Int. Cl.[7] .................................................. G02B 26/00
[52] U.S. Cl. .......................... 359/296; 359/298; 345/107; 427/214; 364/15
[58] Field of Search ..................... 359/296, 298; 345/107; 427/214; 364/15, 4

[56] References Cited

U.S. PATENT DOCUMENTS

| | | | |
|---|---|---|---|
| 4,143,103 | 3/1979 | Sheridon | 264/4 |
| 5,708,525 | 1/1998 | Sheridon | 359/296 |
| 5,717,514 | 2/1998 | Sheridon | 359/296 |
| 5,737,115 | 4/1998 | Mackinlay et al. | 359/296 |
| 5,739,801 | 4/1998 | Sheridon | 345/84 |
| 5,767,826 | 6/1998 | Sheridon et al. | 345/84 |
| 5,892,497 | 4/1999 | Robertson | 359/296 |
| 5,914,805 | 6/1999 | Crowley | 359/296 |

FOREIGN PATENT DOCUMENTS 404199086 7/1992 Japan.

*Primary Examiner*—Georgia Epps
*Assistant Examiner*—Evelyn A. Lester
*Attorney, Agent, or Firm*—Nola Mae McBain

[57] ABSTRACT

Several variations in full-color additive gyricons are shown. Each gyricon shown has been designed for ease of construction by eliminating the need for precise placement of rotating elements, alignment between the gyricon layers, if any, and alignment between the gyricon sheet and the addressing device.

27 Claims, 22 Drawing Sheets

ADDITIVE COLOR ELECTRIC PAPER WITHOUT REGISTRATION OR ALIGNMENT OF INDIVIDUAL ELEMENTS

INCORPORATION BY REFERENCE

The following U.S. patents are fully incorporated by reference:

U.S. Pat. No. 5,982,346, issued, currently no patent number, by Sheridon, titled "Fabrication Of A Twisting Ball Display Having Two Or More Different Kinds Of Balls", issued Nov. 9$^{th}$, 1999;

U.S. Pat. No. 5,914,805, now U.S. Pat. No. 5,914,805, by Crowley, titled "Gyricon Display With Interstitially Packed Particle Arrays" issued Jun. 22$^{nd}$, 1999;

U.S. patent application Ser. No. 08/960,865, still pending, by Sheridon et al., titled "Twisting Cylinder Display", filed Oct. 30$^{th}$, 1997;

U.S. Pat. No. 4,143,103, by Sheridon, titled "Method Of Making A Twisting Ball Display", issued Mar. 6$^{th}$, 1979;

U.S. Pat. No. 5,389,945, by Sheridon, titled "Writing System Including Paper-Like Digitally Addressed Media And Addressing Device Therefor", issued Feb. 14th, 1995;

U.S. Pat. No. 5,717,514, by Sheridon, titled "Polychromal Segmented Balls For A Twisting Ball Display", issued Feb. 10$^{th}$, 1998;

U.S. Pat. No. 5,724,064, by Stefik et al., titled "Computing System With An Interactive Display", issued Mar. 3$^{rd}$, 1998;

U.S. Pat. No. 5,737,115, by Mackinlay et al., titled "Additive Color Tristate Light Valve Twisting Ball Display", issued Apr. 7$^{th}$, 1998;

U.S. Pat. No. 5,739,801, by Sheridon, titled "Multithreshold Addressing Of A Twisting Ball Display", issued Apr. 14$^{th}$, 1998;

U.S. Pat. No. 5,754,332, by Crowley, titled "Monolayer Gyricon Display" issued May 19$^{th}$, 1998;

U.S. Pat. No. 5,808,783, by Crowley, titled "High Reflectance Gyricon Display" issued Sep. 15$^{th}$, 1998;

U.S. Pat. No. 5,825,529 by Crowley, titled "Gyricon Display With No Elastomer Substrate" issued Oct. 20$^{th}$, 1998.

BACKGROUND

This invention relates generally to electric paper and gyricon displays and more particularly concerns an additive color gyricon display in which the individual color elements for providing additive color need not be aligned with respect to each other or with respect to an addressing system.

Additive color display systems are well known and many examples of them exist. For instance, televisions and CRT displays typically use additive color systems. The commonality between different additive color displays is that they all use at least the three elements of red, blue and green to provide a nearly full color gamut. White may be provided by the additive color mixing of red, blue and green and black may be provided by the inclusion of a black background matrix or by other means.

Many different arrangements of the red, blue, and green elements exist. Some minimal combination of the elements forms a pixel, with each individual color element forming a subpixel. In all cases the subpixels must each be independently addressable to allow them to be turned on or off as needed to create desired colors.

Gyricon technology was first developed over twenty years ago. Gyricon displays have numerous advantages over conventional electrically addressable visual displays, such as LCD and CRT displays. In particular, gyricon displays are suitable for viewing in ambient light, retain an image indefinitely in the absence of an applied electric field, and can be made lightweight, flexible, foldable, and with many other familiar and useful characteristics of ordinary writing paper. Thus, at least in principle, they are suitable both for display applications and for so-called electric paper or interactive paper applications, in which they serve as an electrically addressable, reusable (and thus environmentally friendly) substitute for ordinary paper. For further advantages of the gyricon, see U.S. Pat. No. 5,389,945, by Sheridon, issued Feb. 14$^{th}$, 1995 titled "Writing System Including Paper-Like Digitally Addressed Media And Addressing Device Therefor" incorporated by reference hereinabove.

U.S. Pat. No. 4,143,103, by Sheridon, titled "Method Of Making A Twisting Ball Display", issued Feb. 10$^{th}$, 1998 details how to make a black and white displayable surface using gyricon technology. More recently, U.S. Pat. No. 5,737,115, by Mackinlay et al., titled "Additive Color Tristate Light Valve Twisting Ball Display", issued Apr. 7$^{th}$, 1998 and U.S. Pat. No. 5,717,514, by Sheridon, titled "Polychromal Segmented Balls For A Twisting Ball Display", issued Feb. 10$^{th}$, 1998 detail color versions, and specifically additive color versions of gyricon displays.

Additive color gyricons come in two general forms. One of these is the additive color gyricon using bi-state or tri-state light valves. This is a gyricon in which the spheres themselves have no chromatically colored segments but which can be used to provide a full-color, red-green-blue (RGB) display. Two approaches to such a display have been described. In both approaches, the spheres in the gyricon sheet act as light valves, in that they can be used to reveal or obscure color dots to or from an observer. The spheres can be rotated through a continuous range of angles, thus allowing a continuous range of color saturation. Each of the dots can be red, green, or blue, and can be formed using, for example, an active light source, a backlit colored filter or transparency, or a reflective colored backing attached to the gyricon sheet and illuminated by ambient light. Thus the gyricon can be adapted for use in a backlit or projective mode or in ambient light.

Construction of this gyricon requires the precise placement and alignment of spheres with the colored dots and also with the mechanism for addressing the spheres. If strict alignment tolerances between the colored dots, the light valve elements and the addressing mechanism are not maintained the system will function incorrectly as the wrong colored dots are shown or obscured.

The second class of additive color gyricon is a full color additive color gyricon which uses spherical rotating elements each of which has clear outer segments and a thin colored central segment. The colored central segment of an individual spherical rotating element can be colored either red, blue or green. When a sphere is positioned such that the central segment appears edge on to an observer, the sphere will appear essentially transparent. When the sphere is then rotated 90 degrees, the colored central segment will essentially fill the field of view with its color.

Construction of this class of gyricon requires that three sets of spheres, one set having red central segments, one set having blue central segments, and one set having green central segments, be precisely placed within a gyricon sheet. Furthermore, the spheres must then be precisely aligned with the addressing electronics. Again, if strict alignment tolerances between the colored elements and the addressing mechanism are not maintained the system will function incorrectly as the wrong colors are provided.

The need for precise placement of individual elements and strict alignment between the elements and the addressing mechanism contribute to the cost and complexity of manufacturing additive color gyricons. It would be greatly desirable if an additive color gyricon could be manufactured that required neither the precise placement of individual elements nor the strict alignment tolerances between elements and the addressing mechanism.

SUMMARY OF THE INVENTION

The present invention provides a gyricon sheet which has a substrate with two opposed surfaces, and at least two layers, wherein one of the surfaces is a viewing surface. Contained within the substrate is a collection of optically anisotropic light modulating elements that are capable of being made rotatable. Each element is capable of producing at least two observable aspects to an observer favorably situated to observe the viewing surface. One aspect is being substantially optically transparent and the other aspect is associated with a first component color. Some of the elements are associated with a first component color, some of the elements are associated with a second component color different from the first component color, and some of the elements are associated with a third component color different from both the first and second component colors. The elements associated with one of the component colors are contained in a different layer from the elements associated with the other component colors, and the first, second, and third component colors are chosen such that when the elements associated with the first, second and third component colors are arranged to present the aspect associated with the component color to be observed simultaneously by an observer situated favorably to observe the viewing surface the observer would view white.

DETAILED DESCRIPTION OF THE INVENTION

While the present invention will be described in connection with a preferred embodiment and method of use, it will be understood that it is not intended to limit the invention to that embodiment or procedure. On the contrary, it is intended to cover all alternatives, modifications and equivalents as may be included within the spirit and scope of the invention as defined by the appended claims.

Multilayer Additive Color Gyricon

A gyricon with a canted-field electrode configuration can be used to provide a full-color, red-green-blue (RGB) additive color image. The system can be used in either a transmissive, backlit sheet or in a reflective sheet.

Figure 1:
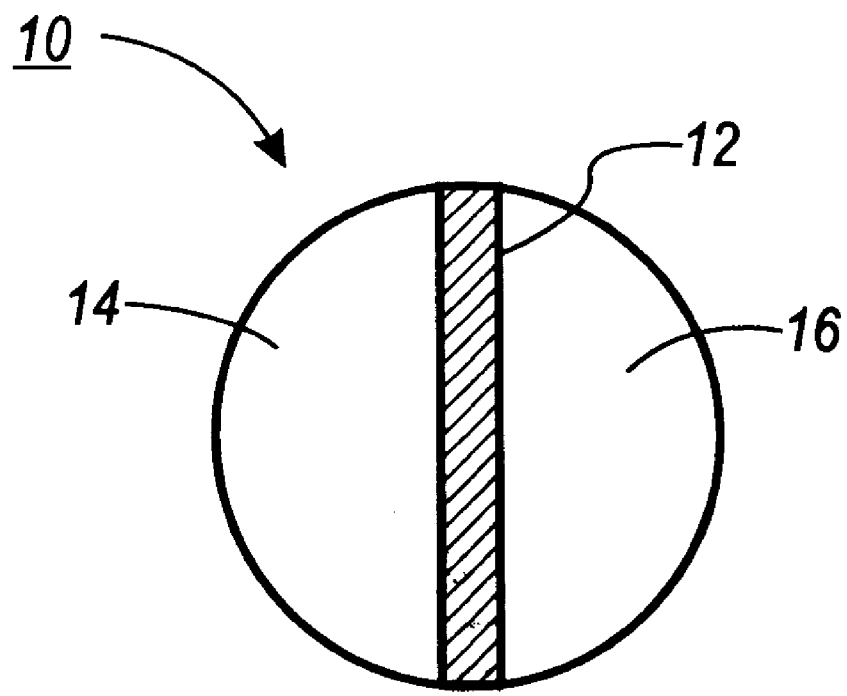
FIG. 1 shows a side view of a 3-segment spherical ball for use as a rotational element in a gyricon of the present invention.

A three-segment sphere, like the sphere 10 illustrated in FIG. 1, can be used for an additive color RGB gyricon, with central segment 12 being made as either a light-transmissive or an opaque red, green, or blue, depending on whether the sheet is to operate in a backlit mode or a reflective mode. Exterior segments 14, 16 are made transparent. The gyricon sheet contains three layers, situated one above the other. One layer contains "red" spheres (that is, spheres whose central segments are red while the exterior segments are transparent); one contains "green" spheres; and one contains "blue" spheres. Within a given layer, a group of one or more spheres can serve to provide a component color for color addition. Preferably, a large number of spheres (for example, nine or more) located near one another are used for each component color in each subpixel. A subpixel is made up of a column of three color regions situated above one another, one region from each of the three layers.

Figure 2:
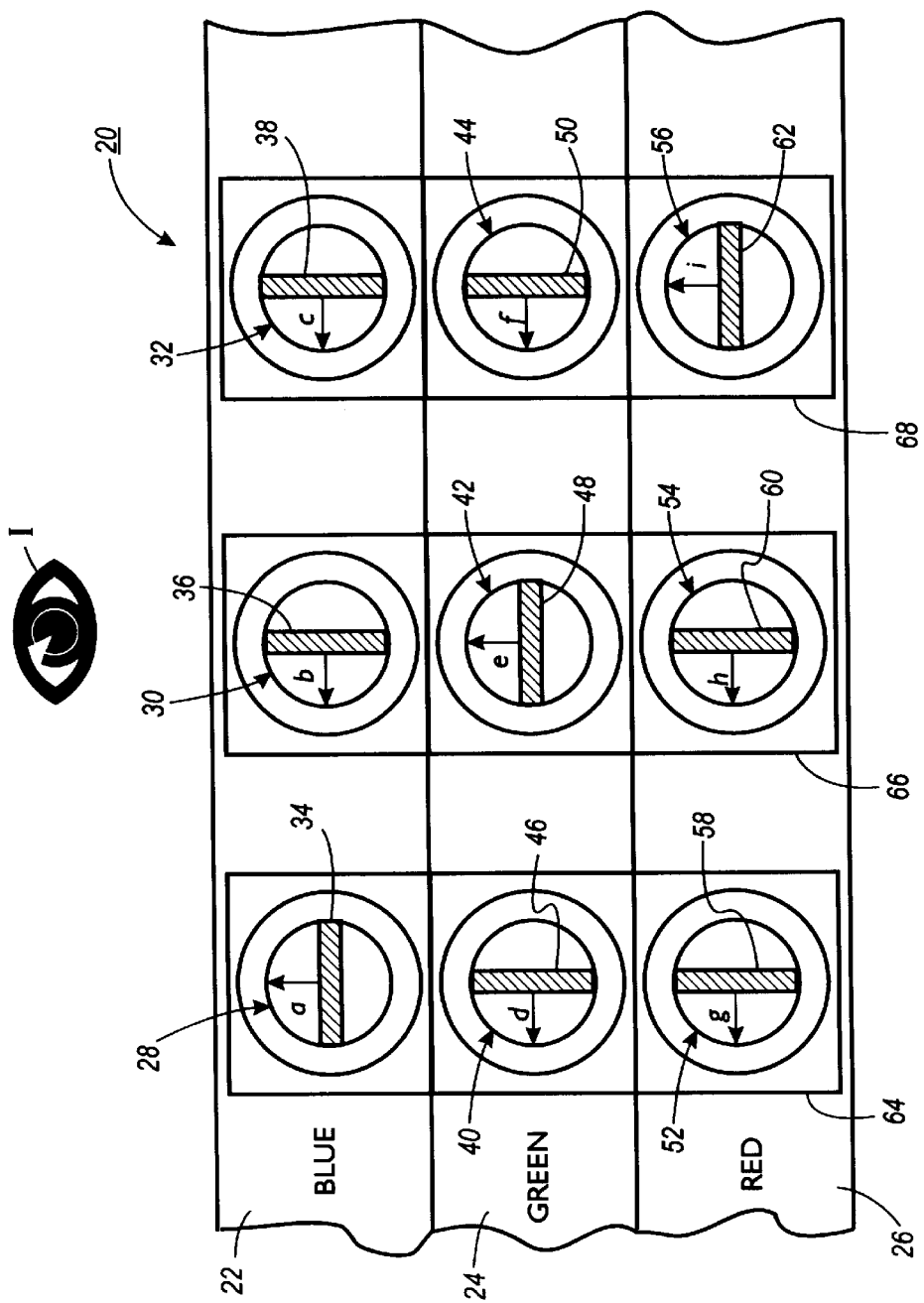
FIG. 2 shows a side view of a gyricon sheet of the present invention.

FIG. 2 illustrates a side view of a portion of an elastomer sheet 20 from an RGB gyricon with an observer at 1 and illustrates a simplified example of the present invention for ease of discussion. Sheet 20 has three layers 22, 24, 26. Spheres in layer 22 include spheres 28, 30, and 32, which have central segments 34, 36, 38, respectively, of a first color, such as blue. For example, sphere 28 has blue central segment 34. Spheres in layer 24 include spheres 40, 42, and 44, which have central segments 46, 48, 50 of a second color, such as green. For example, sphere 40 has green central segment 46. Spheres in layer 26 include spheres 52, 54, and 56, which have central segments 58, 60, 62 of a third color, such as red. For example, sphere 52 has red central segment 58. Each layer of a subpixel is independently addressable and therefore in this simplified case each of the spheres 28, 30, 32, 40, 42, 44, 52, 54, and 56 is made individually addressable, as is known in the art. The orientation directions of these spheres are indicated by arrows a, b, c, d, e, f, g, h, and j, respectively.

A column is formed by a combination of one or more color regions that are superimposed. Thus, for example, the spheres 28, 40, and 52 which are in the same rectangular columnar portion of sheet 20 form column 64. Similarly, the spheres 30, 42, and 54 which are in the same rectangular columnar portion of sheet 20 form column 66, and the spheres 32, 44, and 56 which are in the same rectangular columnar portion of sheet 20 form column 68.

Figure 3:
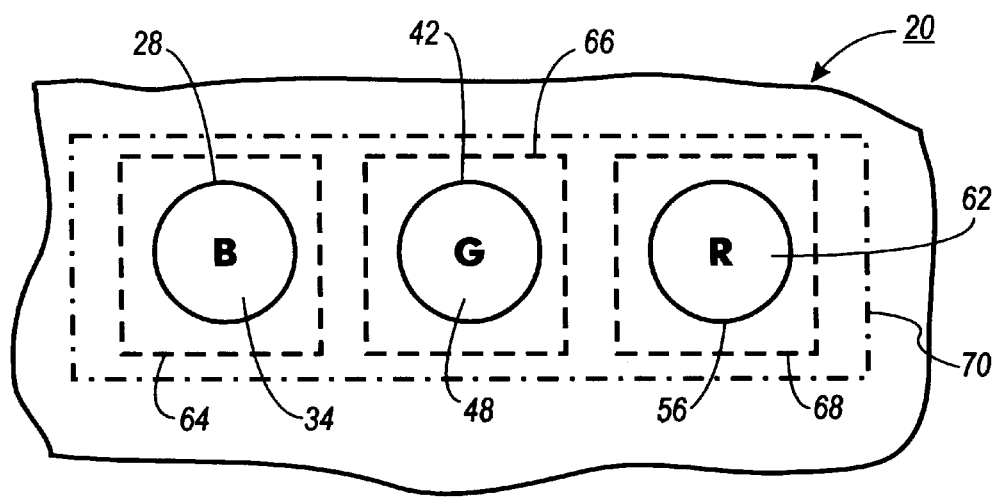
FIG. 3 shows a top view of the gyricon sheet shown in FIG. 2.

FIG. 3 illustrates a top view of the elastomer sheet 20 and the three columns 64, 66, 68 shown in FIG. 2 from the perspective of the observer at 1. The central portion of one sphere in each column is visible to the observer at 1. This is because the spheres 28, 42, and 56 all are oriented with their central segments 34, 48, 62 facing an observer at 1, so that full color saturation obtains for the red, green, and blue components, respectively. The spheres 30, 32, 40, 44, 52, and 54 all are oriented with their central segments edge-on with respect to an observer at 1, so that all these spheres look substantially transparent. Accordingly, column 64 appears substantially blue, column 66 appears substantially green, and column 68 appears substantially red.

A pixel 70 is formed from at least three adjacent columns such as columns 64, 66, and 68 as shown in FIG. 3. This is due to the way color is mixed in an RGB system. Colors other than red, blue, or green are "mixed" in an additive system, by relative densities of adjacent red, blue and green components in a given pixel. For example, a pixel which shows ⅓ blue, ⅓ green, and ⅓ red, such as pixel 70 in FIG. 3, will be perceived by the eye as white. Only one color is viewed in a column at a time. Therefore, in order to provide all component colors and to allow for proper color mixing, a pixel must contain at least one column for each component color. In practice an RGB gyricon is likely to have many columns for each component color in each pixel instead of the simplified one column per component color shown in this example. Nevertheless, the one-column-per-color arrangement illustrated here is also possible, and provides an easily understood example for purposes of discussion.

Figure 4:
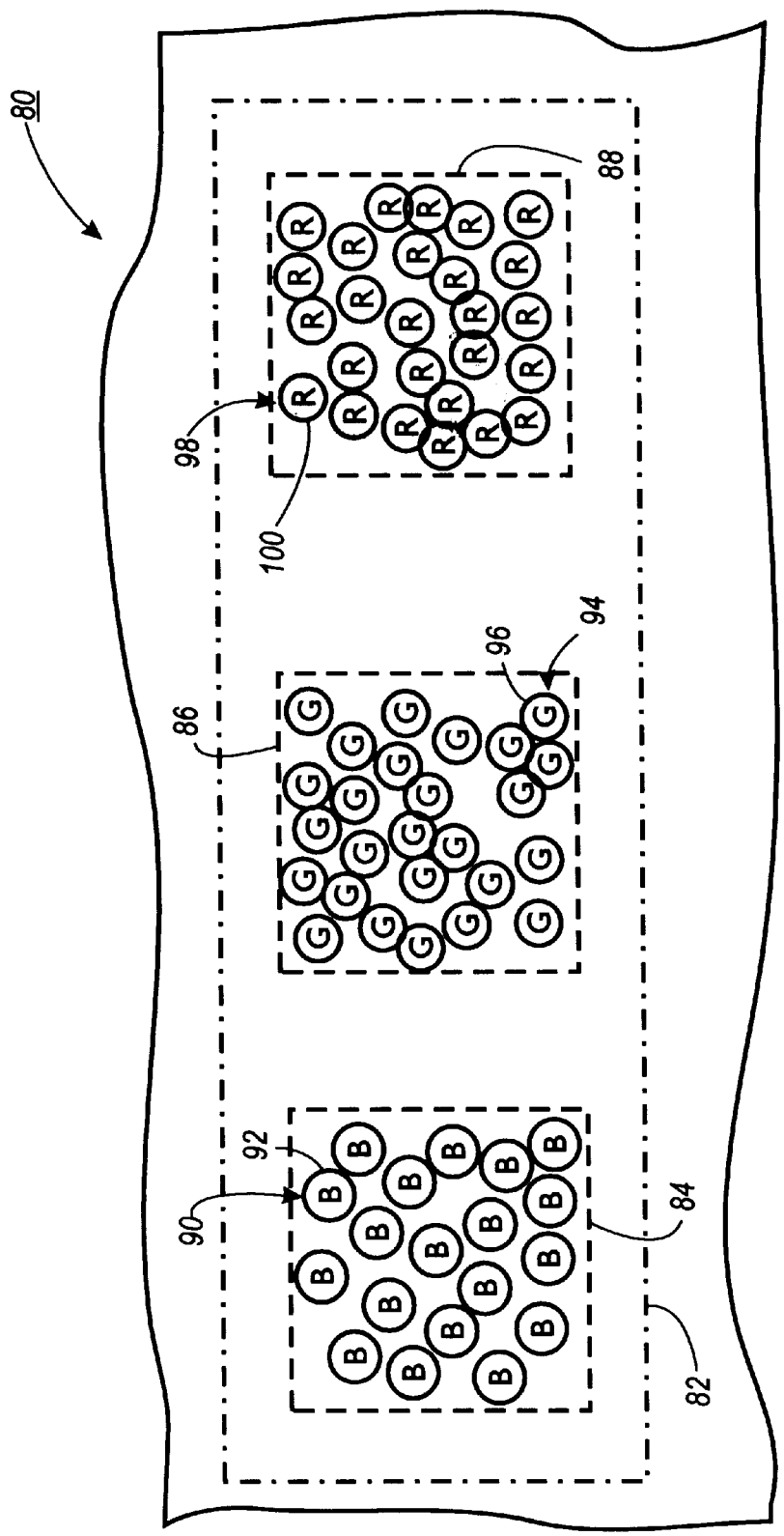
FIG. 4 shows a top view of a gyricon sheet of the present invention in an alternate embodiment.

FIG. 4 illustrates a top view of a pixel 82 in a sheet 80 where each column forms a subpixel 84, 86, 88 which is comprised of a multiplicity of spheres randomly distributed within each color component layer. For ease of comparison to FIG. 3, the spheres are arranged such that subpixel 84 appears blue to an observer and subpixels 86 and 88 appear green and red respectively. Subpixel 84 shows spheres 90 with blue central segments 92 oriented facing towards the observer while spheres of the other colors are oriented with their central segments edge-on to the observer making the subpixel 84 appear substantially blue. Subpixel 86 shows spheres 94 oriented with green central segments 96 oriented facing towards the observer, while spheres of the other colors are oriented with their central segments edge-on to the observer, making the subpixel 86 appear substantially green. Subpixel 88 shows spheres 98 with red central segments 100 oriented facing towards the observer while spheres of other colors are oriented with their central segments edge-on to the observer, making the subpixel 88 appear substantially red.

Figure 5:
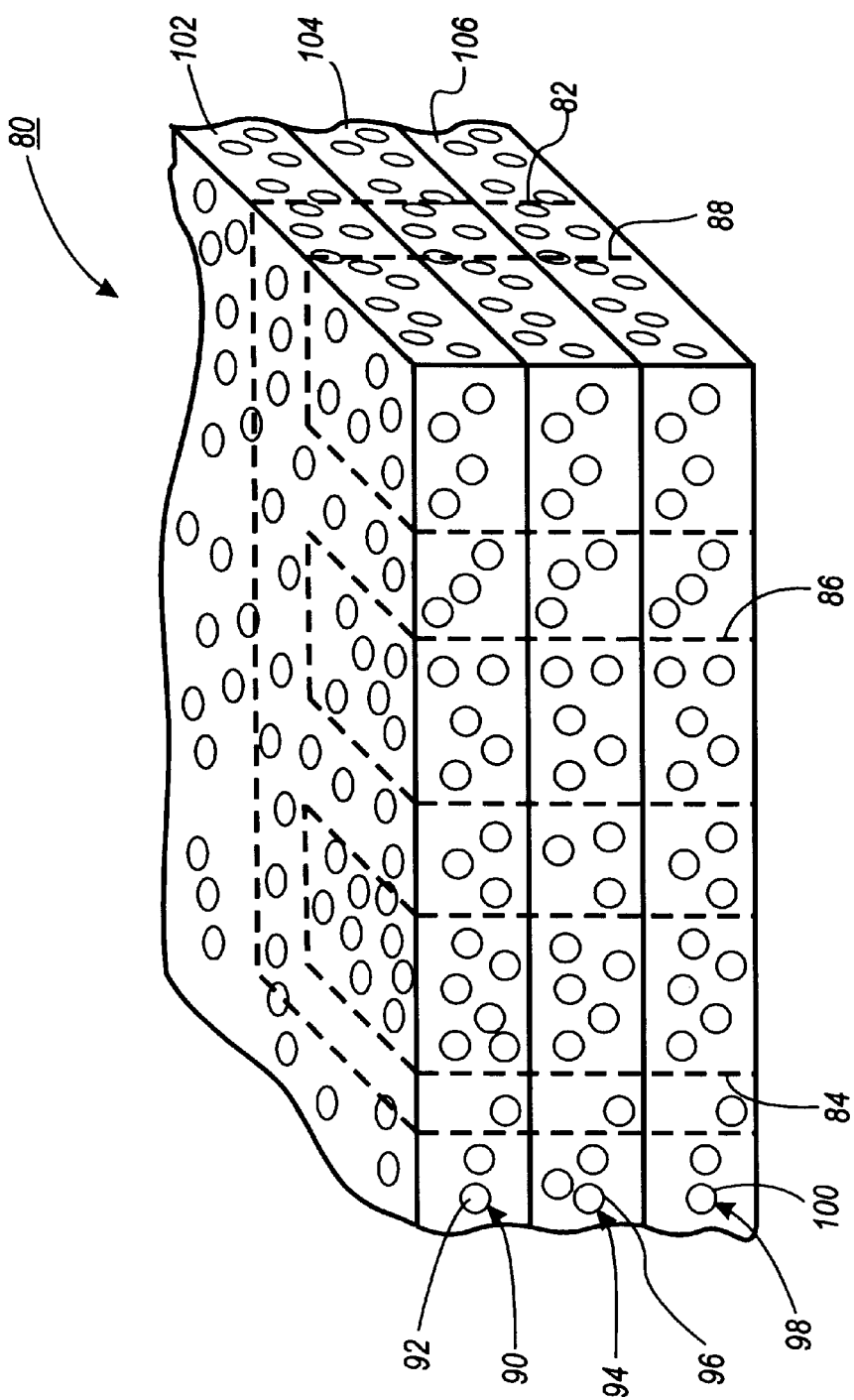
FIG. 5 shows a perspective view of the gyricon sheet shown in FIG. 4.

FIG. 5 illustrates a perspective view of pixel 82 in sheet 80 showing how each column forms the subpixels 84, 86, 88 of pixel 82. Notice that sheet 80 has three layers 102, 104, 106 with a multiplicity of spheres 90, 94 and 98 which are shown here as randomly distributed within each layer. Other packing arrangements will be detailed hereinbelow.

The sheet 80 can be fabricated either from three separate elastomer sheets (one for each color of spheres) laid down on top of one another, or from a single sheet in which successive layers of different colored spheres are laid down. U.S. patent No. 5,982,346, titled "Fabrication Of A Twisting Ball Display Having Two Or More Different Kinds Of Balls" by Sheridon, which is assigned to the same assignee and incorporated by reference hereinabove, provides fabrication details for making a multi-layer sheet. Each subpixel 84, 86, and 88 is made up of a large number of spheres 90, 94, and 98, and according to the invention, the spheres of one sheet or layer need not be aligned with those of any other sheet or layer. However, it should be noted that if a sheet is constructed so that each pixel contains a small number of spheres, for instance only one of each color per subpixel as shown in FIG. 2, the spheres in the different layers preferably should be aligned so as to facilitate proper color addition.

Preferably each of the three layers 102, 104, and 106 of a sheet 80 can be addressed separately from the other two layers. One way to accomplish this is to provide a separate addressing electrode for each gyricon layer, as is known in the art. Such addressing methods are described in U.S. Pat. No. 5,717,514, by Sheridon, titled "Polychromal Segmented Balls For A Twisting Ball Display" issued on Feb. 10$^{th}$, 1998, and incorporated by reference herein.

However, a sheet 80 having a separate electrode per layer can be cumbersome and expensive to produce. Also, the many layers of electrodes and conductive shielding can cut down on the amount of light that passes through the sheet 80, so that the image loses brightness. Thus it can be preferable in some circumstances to address all layers of a sheet 80 with a single electrode assembly as is also known in the art. Such an addressing scheme is fully described in U.S. Pat. No. 5,739,801 entitled "Multithreshold Addressing Of A Twisting Ball Display", by Sheridon, issued Apr. 14$^{th}$, 1998, and hereinabove incorporated by reference.

The sheet 80 can be constructed without any need for precision alignment of the addressing electrodes with respect to the sheet 80 or the layers of the sheet with respect to each other. Pixels, such as pixel 82, and subpixels, such as subpixels 84, 86, and 88, will be formed wherever the electrodes happen to be, as shown in FIGS. 6–8.

Figure 6:
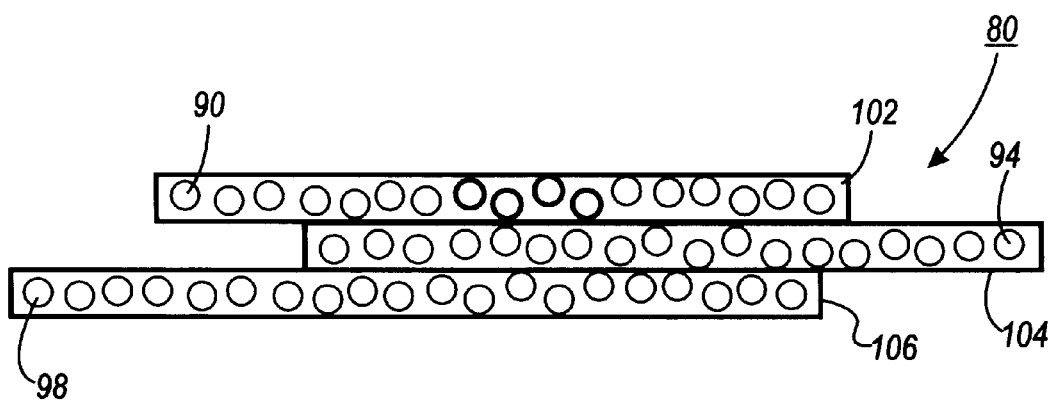
FIG. 6 shows a side view of a first step in constructing a gyricon sheet of the present invention.

FIG. 6 shows the three individual single layers 102, 104, and 106 being assembled into the three-layer sheet 80 shown in FIG. 5. Although each individual layer 102, 104, and 106 is depicted with a random distribution of spheres 90, 94, and 98 respectively, each layer can be fabricated using any known structures or techniques, such as those discussed hereinbelow with respect to FIGS. 8–15, and each layer can be fabricated independently from the other layers. Furthermore, the three layers 102, 104, and 106 may be assembled in any orientation with respect to each other. The layers 102, 104, and 106 may be rotated and/or translated with respect to each other and need not be aligned in any way.

Once the individual layers have been constructed, the layers can be combined without the need for registration or alignment to each other. For example, individual layers may be adhered to each other using suitably transparent adhesives. Alternatively, successive layers may be fabricated on top of previously fabricated layers. When the addressing electrodes are added, if more than one set is used, they must be aligned with each other, but need not be aligned with any of the sheets. This is illustrated in FIGS. 7–8 which shows the sheet 80 with a front electrode grid 120 and back electrode 110.

Figure 7:
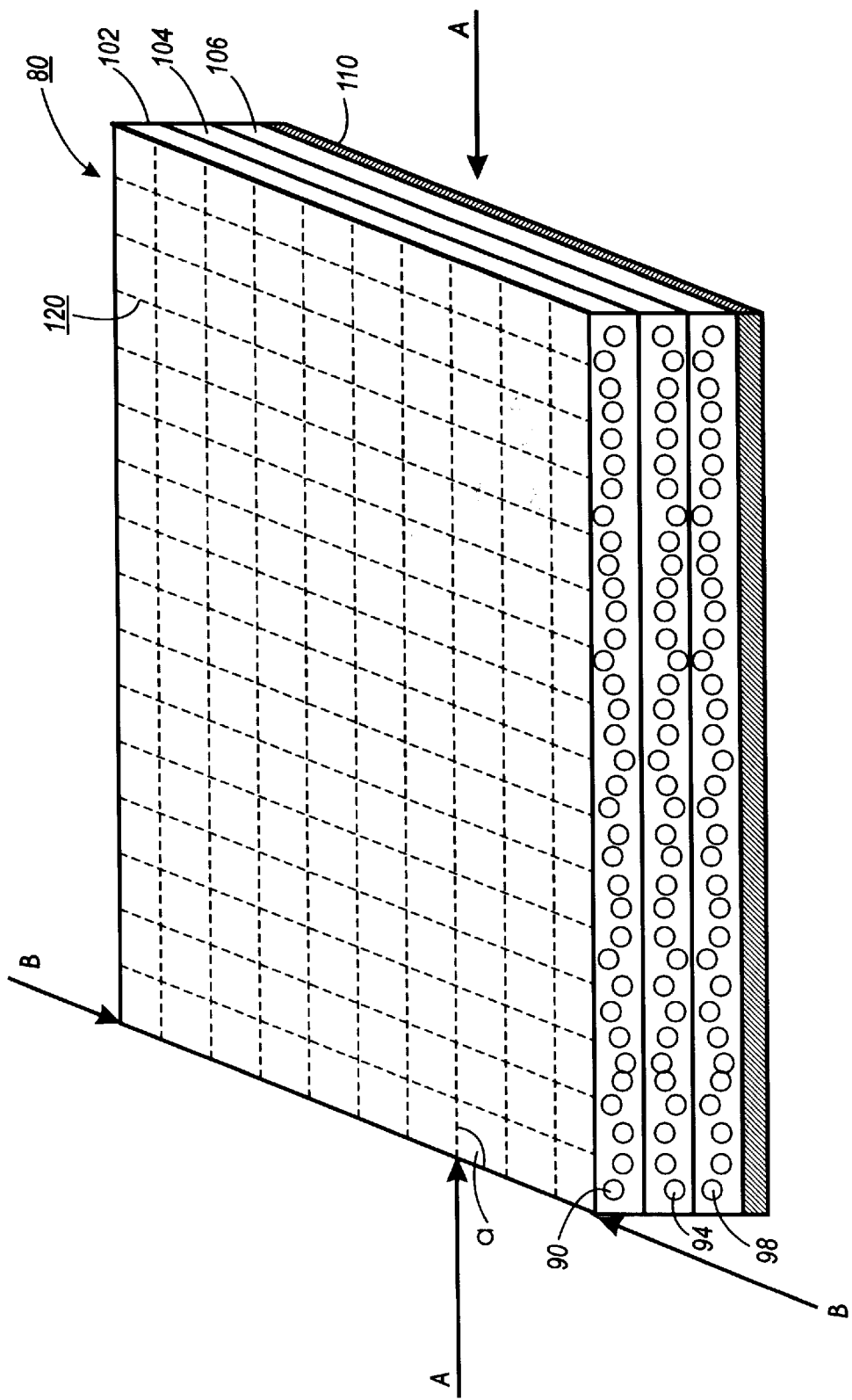
FIG. 7 shows a perspective view of a second step in constructing a gyricon sheet of the present invention.
Figure 8:
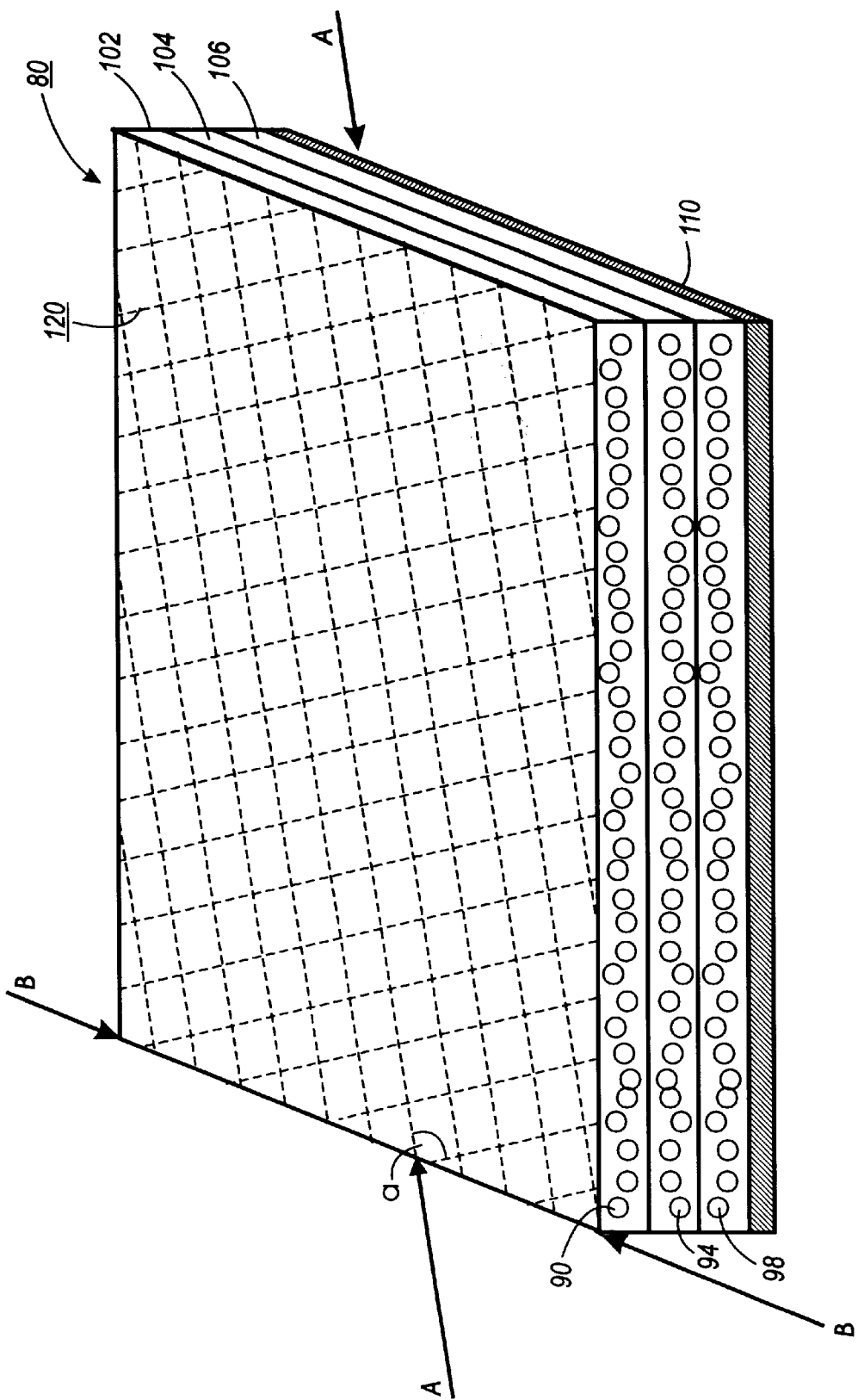
FIG. 8 shows a perspective view of an alternate embodiment of a second step in constructing a gyricon sheet of the present invention.

In FIG. 7, the front electrode grid 120 aligns in a parallel matrix with the edges of the sheet 80. The angle $\alpha$, which is the angle between a horizontal matrix row A, and leftmost edge B of sheet 80, equals 90 degrees. However, in FIG. 8 the front electrode grid 120 does not align with the edges of the sheet 80. Thus the angle $\alpha$ is no longer equal to 90 degrees, but rather is some arbitrary angle. Put another way, in FIG. 8 the rows and columns of the addressing matrix formed by front electrode grid 120 are skewed with respect to the edge of sheet 80. The sheet 80 can be placed with respect to the front electrode grid 120 as shown in either FIG. 7 or FIG. 8 and will still work perfectly well. This feature is particularly useful in connection with devices that use gyricon sheets as removable displays, as shown in U.S. Pat. No. 5,724,064 by Stefik et al., issued Mar. $3^{rd}$, 1998 and titled "Computing System With An Interactive Display", and incorporated by reference hereinabove, because it facilitates easy insertion and removal of gyricon sheets into and out of such devices. In particular, even if the gyricon sheet is somewhat skewed or otherwise misaligned with respect to the device, the device can still function adequately.

This is an advantage of the inventive additive color gyricon over previously known additive color gyricons. In known color additive gyricons, each of the subpixels must be aligned properly with the subpixel array elements of the addressing electrodes 110, 120 to ensure that an applied electric field causes one and only one subpixel of the appropriate color to be addressed. A misalignment between the array elements of the addressing electrode 110, 120 and the array elements of the gyricon sheet can cause portions of multiple subpixels of the sheet to be addressed by a single array element of the electrode, and so can cause color errors, such as substitution of red subpixels for green and blue for red, in the produced image. By comparison, in the additive color gyricon of the present invention these problems do not arise. Instead, the addressing electrodes 110, 120 need only be aligned to each other, and can be placed anywhere with respect to the gyricon sheet 80. If a multiple-electrode assembly is used (not shown) the electrodes for the different layers must be aligned with one another, but again, there is no need to align the layers of elastomer to the electrodes, or to align the layers of elastomer to each other.

Figure 9:
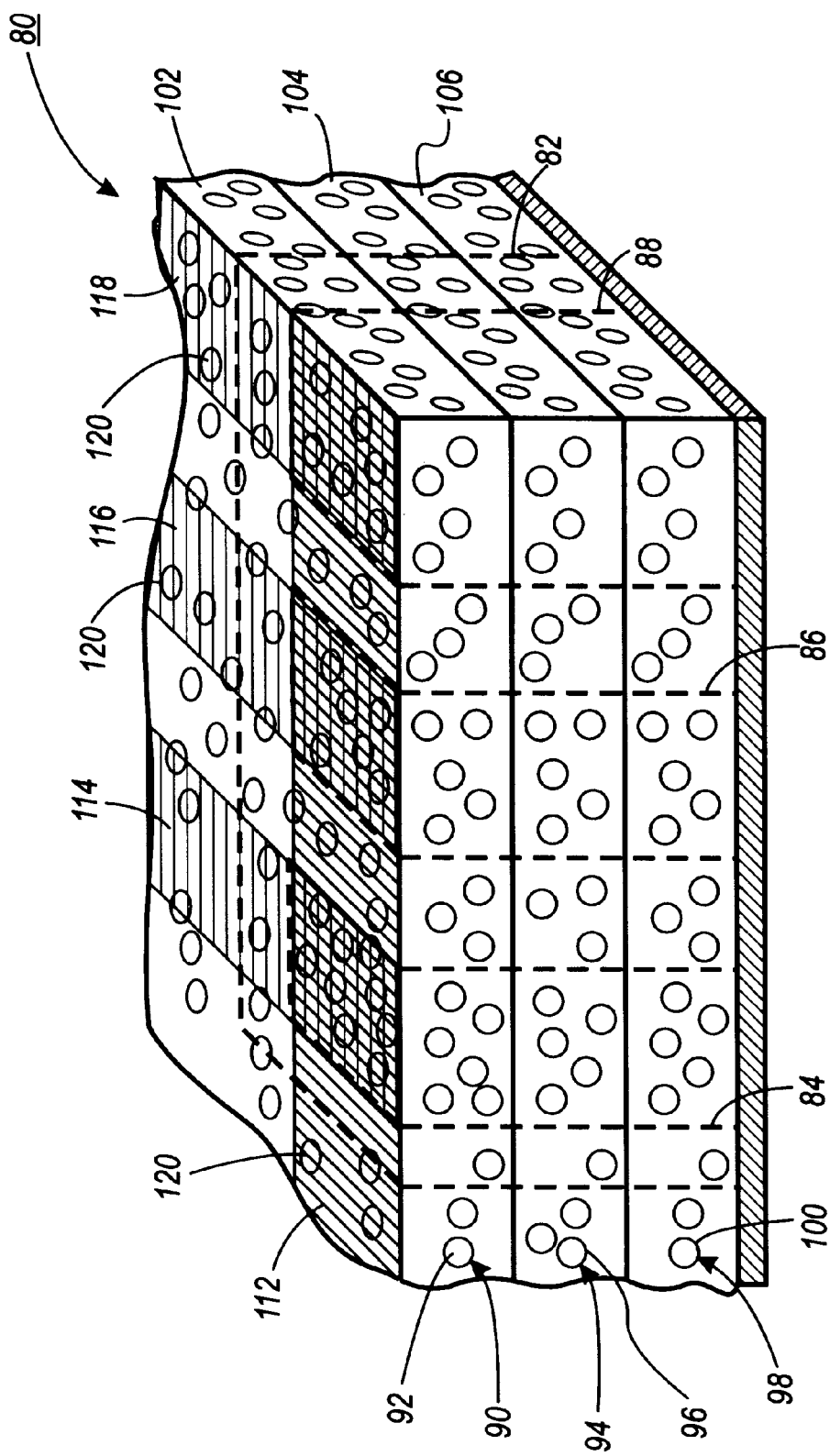
FIG. 9 shows a perspective view of a single pixel of a gyricon of the present invention.

In FIG. 9 this concept is further illustrated by showing a closer perspective view of the simple matrix electrode addressing scheme with the sheet 80 as shown in FIGS. 6–8. The matrix electrode includes a back electrode 110 (the electrode furthest from an observer at 1) and two sets of parallel electrodes for the front electrode grid 120 (the electrode closest to an observer at 1). The first set of parallel electrodes is represented by strip electrode 112. The second set of parallel electrodes is represented by strip electrodes 114, 116, 118 which are transverse to strip electrode 112. As illustrated in FIG. 9, subpixel 84 is created where strip electrode 112 crosses with strip electrode 114; subpixel 86 is created where strip electrode 112 crosses with strip electrode 116; and subpixel 88 is created where strip electrode 112 crosses with strip electrode 118. The type of addressing used and placement on the sheet 80 is unimportant; subpixels will be solely created by electrode placement. The only limiting factor is that a subpixel cannot be smaller than the smallest individually addressable portion of the sheet 80. The smallest individually addressable portion of a sheet is a column containing at least one rotatable element from each layer, as is shown in FIG. 2, although not necessarily aligned as shown in FIG. 2.

In contrast with the previously known additive color gyricons, subpixels need not be dedicated to a specific color in the additive color gyricon as constructed in FIGS. 2, 5, and 9. Rather, because the entire field of each subpixel is filled with all the component colors, overlaid on one another, every subpixel has the capacity to provide every one of the component colors red, green, and blue. Thus the additive color gyricon of the present invention can provide a wider color gamut with better saturation of component colors (red, blue or green) because when a particular component color is desired from a given pixel, the entire pixel can be selected to be that component color, instead of merely using the subpixel of that component color as would be the case in a conventional system. The color gamut is further broadened because additional selections for color mixing are also available. For instance, two subpixels may be chosen to be one color, such as red, while the third subpixel may be chosen as another color, such as blue. In a conventional system such choices for color mixing are unavailable because each subpixel can only display its dedicated color. The result is that the additive color gyricon of the present invention is more versatile than previous additive color gyricons or other additive color displays. The additive color gyricon of the present invention can be used in a conventional manner with subpixels dedicated to a specific color, either red, blue or green. However, it need not be, and addressing schemes can be used which take advantage of the expanded color gamut available by using subpixels which are not dedicated to a single color but are capable of displaying any one of the component colors.

To ensure the highest levels of color saturation and overall image quality in the additive color gyricon, each component color layer of each pixel should present as complete a sphere fill to the observer as possible. Several methods are known in the art for obtaining high areal coverage. For instance, the packing methods described in U.S. Pat. No. 5,754,332 by Crowley, titled "Monolayer Gyricon Display" issued on May $19^{th}$, 1998; U.S. Pat. No. 5,808,783, by Crowley titled "High Reflectance Gyricon Display" issued Sep. $15^{th}$, 1998; U.S. Pat. No. 5,914,805, by Crowley titled "Gyricon Display With Interstitially Packed Particle Arrays" filed Sep. $13^{th}$, 1996; and U.S. Pat. No. 5,825,529 by Crowley titled "Gyricon Display With No Elastomer Substrate" issued Oct. 20, 1998 and incorporated by reference hereinabove can be applied to the additive color gyricon of this invention as shown hereinbelow with reference to FIGS. 8–13. Any of these packing structures can be used for the layers of the inventive gyricon, e.g., the layers 22, 24, 26, of the embodiment shown in FIG. 2.

Figure 10:
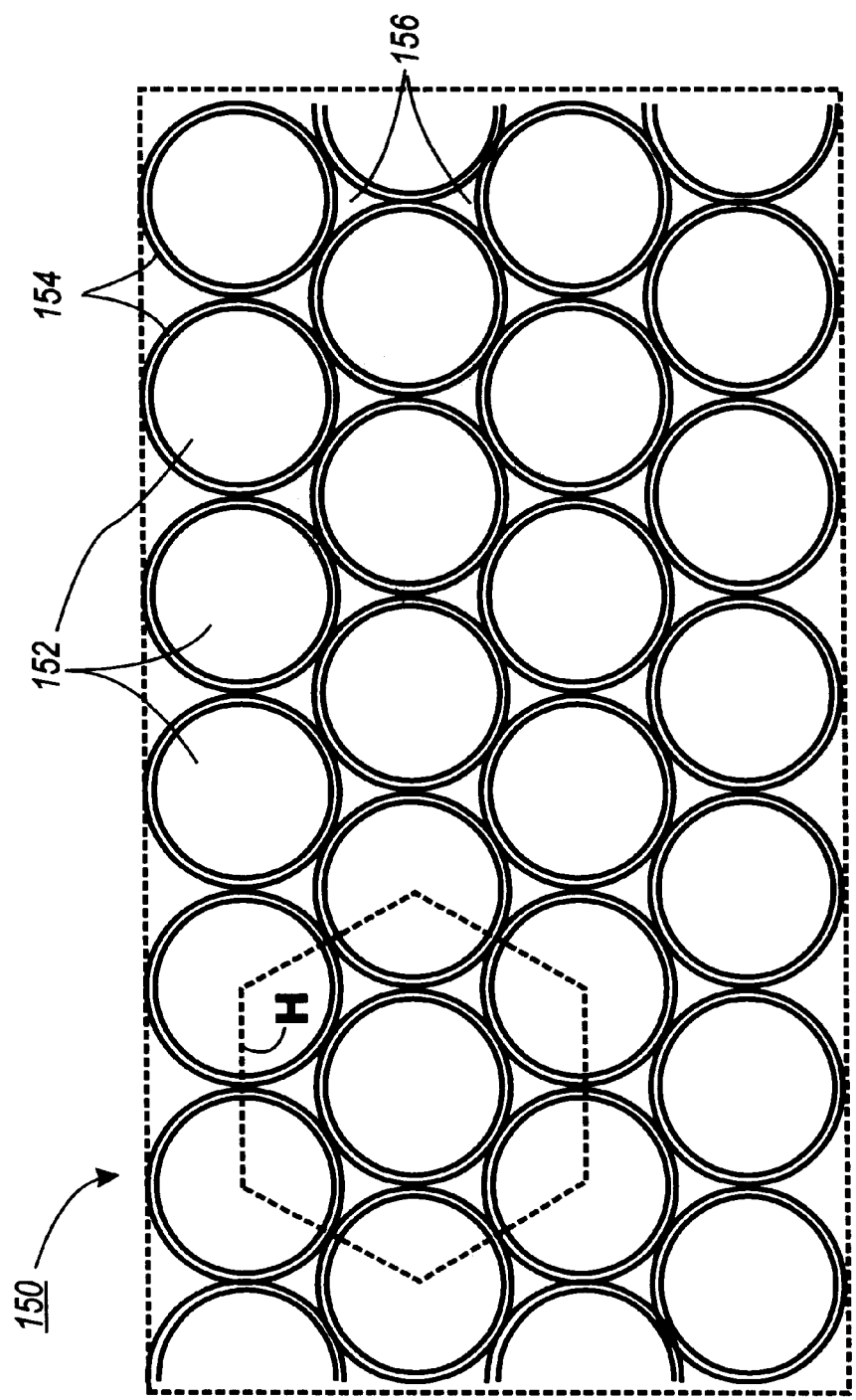
FIG. 10 shows a top view of a hexagonal arrangement for a gyricon sheet.

FIG. 10 shows the top view of a single close-packed monolayer of spheres 152 in a portion of a gyricon sheet 150 as discussed in U.S. Pat. No. 5,754,332 titled "Monolayer Gyricon Display". The spheres 152 are shown within cavities 154 that are as small as feasible, and still permit rotation of the spheres 152, and are packed together as closely as possible. The packing arrangement used is a hexagonal packing arrangement, which is indicated thereon by hexagon H, leaving interstices 156 between the spheres 152.

Figure 11:
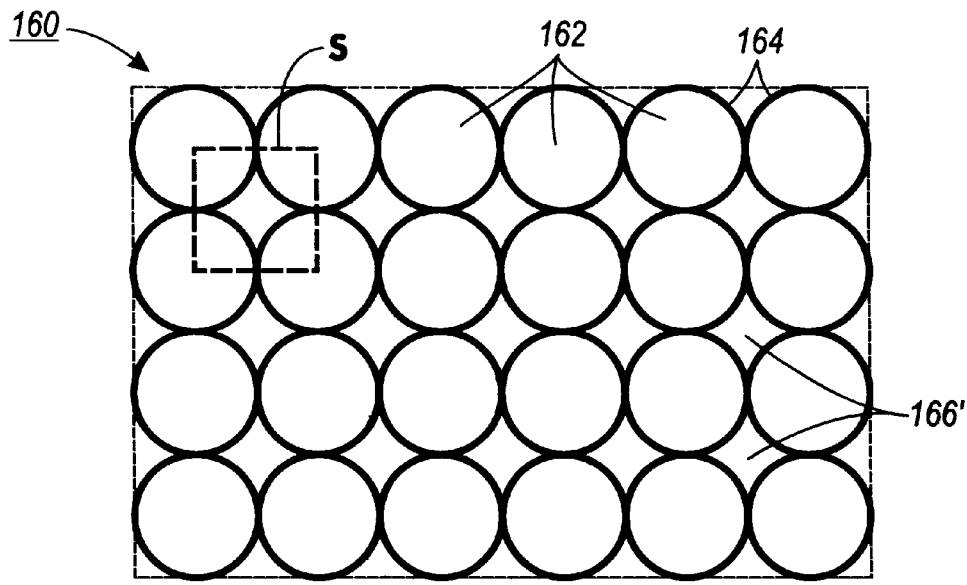
FIG. 11 shows a top view of a square packing arrangement for a gyricon sheet.

FIG. 11 shows the top view of a second embodiment of a single close-packed monolayer of spheres 162 in a portion of a gyricon sheet 160 as discussed in U.S. patent Ser. No. 5,754,332 titled "Monolayer Gyricon Display". The spheres 162 are shown within cavities 164 that are as small as feasible, and still permit rotation of the spheres 162, and are packed together as closely as possible. The packing arrangement used is a square packing arrangement, indicated thereon by square S, leaving interstices 166 between the spheres 162.

Figure 12:
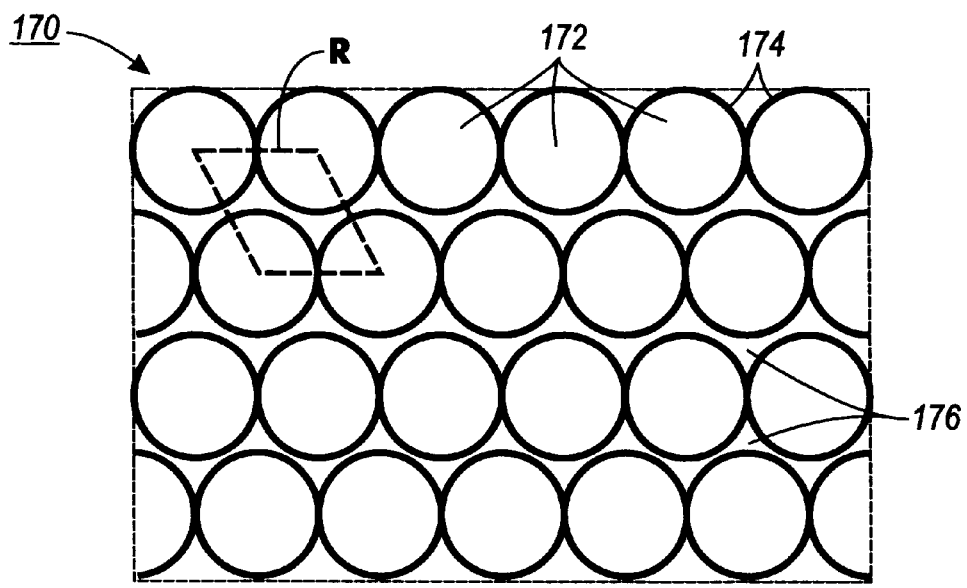
FIG. 12 shows a top view of a rhomboidal packing arrangement for a gyricon sheet.

FIG. 12 shows the top view of a third embodiment of a single close-packed monolayer of spheres 172 in a portion of a gyricon sheet 170 as discussed in U.S. Pat. No. 5,754,332 titled "Monolayer Gyricon Display". The spheres 172 are shown within cavities 174 that are as small as feasible, and still permit rotation of the spheres 172, and are packed together as closely as possible. The packing arrangement used is a rhomboid packing arrangement, indicated thereon by rhombus R, which leaves interstices 176 between the spheres 172.

Figure 13:
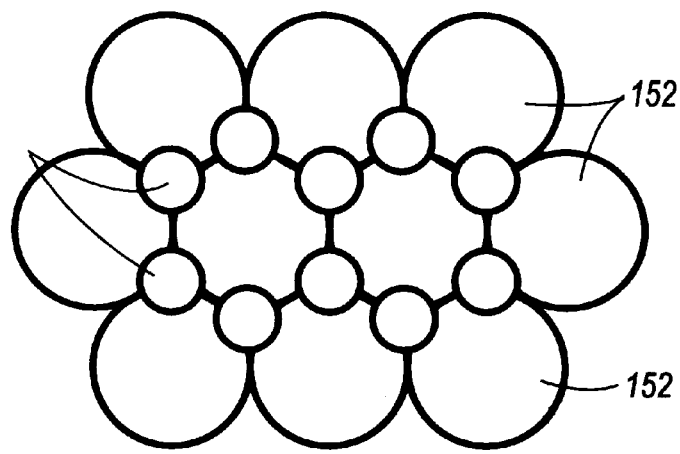
FIG. 13 shows a top view of a first close packing arrangement for a gyricon sheet.
Figure 14:
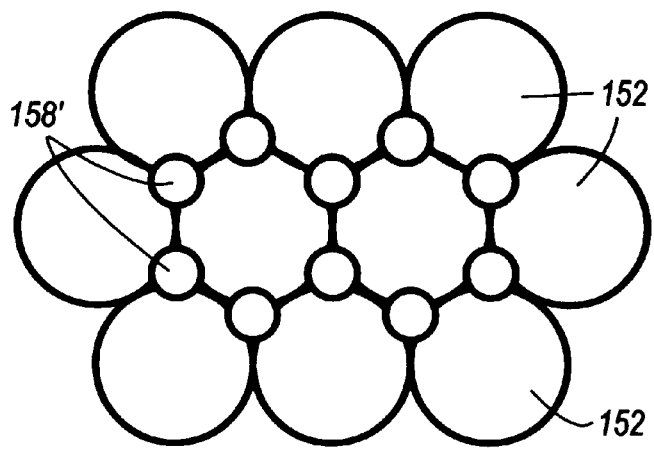
FIG. 14 shows a top view of a second close packing arrangement for a gyricon sheet.
Figure 15:
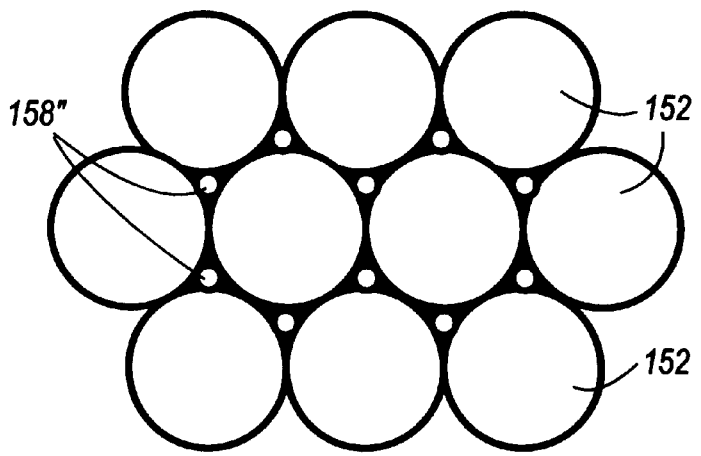
FIG. 15 shows a top view of a third close packing arrangement for a gyricon sheet.

Ideally, a close-packing arrangement would entirely cover the plane with a monolayer of gyricon elements. However, inasmuch as a planar array of spheres cannot fully cover the plane, but must necessarily contain interstices, the best that can be achieved with a single population of uniform-diameter spherical elements is about 90.7 percent areal coverage, which is obtained with the hexagonal packing geometry shown in FIG. 10. A second population of smaller balls can be added to fill in the gaps somewhat as shown in FIGS. 13–15 and discussed in more detail in U.S. Pat. No. 5,914,805, entitled "Gyricon Display With Interstitially Packed Particle Arrays". Again, any of these packing structures can be used for the individual layers, such as layers 22, 24, 26 shown in FIG. 2, to improve the color saturation of the individual layers and the additive color gyricon of this invention as a whole.

FIGS. 13–15 are all variations of the hexagonal packing structure shown in FIG. 10. Spheres 152 are packed hexagonally with interstitial spheres 158 packed between them. In FIG. 13, interstitial spheres 158 are large enough that they sit in a plane slightly above the spheres 152. In FIG. 14 the interstitial spheres 158' are made slightly smaller and in FIG. 15 the interstitial spheres 158" are smaller yet so that they reside fully between the spheres 152. However, this complicates display fabrication and results in a tradeoff between light losses due to unfilled interstices and light losses due to absorption by the undersides of the central segments of the smaller interstitial spheres.

Another variation in gyricon construction, made to improve areal coverage, is to utilize cylindrical rotational elements in place of the spherical rotational elements described thus far. Twisting cylinder displays have been described in copending U.S. patent application Ser. No. 08/960,865, by Sheridon et al. and titled "Twisting Cylinder Displays", herein incorporated by reference, and their application to the individual layers of the additive color gyricon of this invention is shown hereinbelow with reference to FIGS. 16 and 17.

Figure 16:
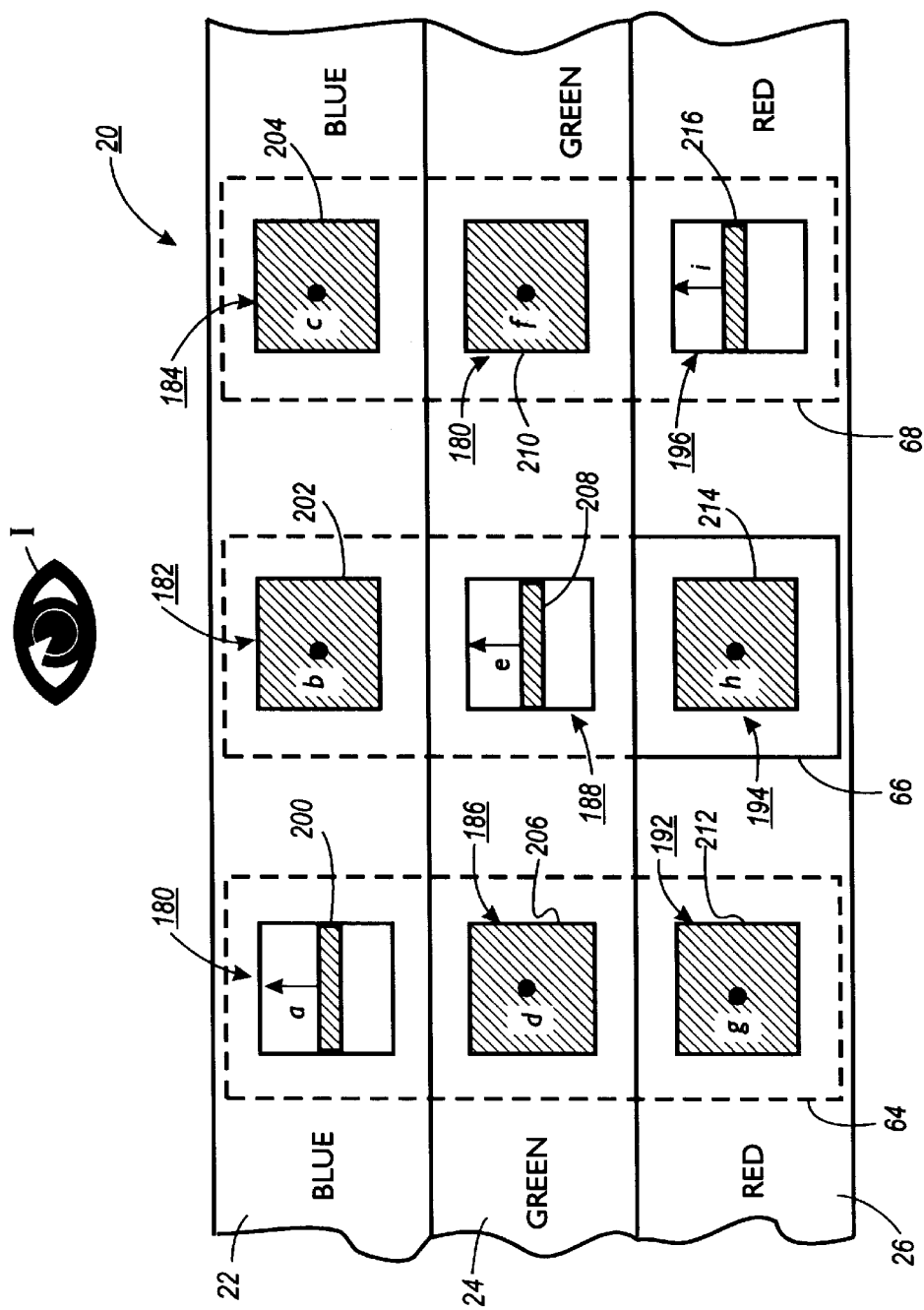
FIG. 16 shows a side view of a gyricon sheet of the present invention using cylindrical elements.

FIG. 16 shows the embodiment of FIG. 2 except that cylindrical rotating elements have been substituted for the spherical rotating elements, where elements that are the same have been given the identical reference numerals. That is, FIG. 16 illustrates a side view of a portion of an elastomer sheet 20 from an RGB gyricon with an observer at 1. Sheet 20 has three layers 22, 24, 26. Cylinders in layer 22, include cylinders 180, 182, and 184, which have central segments 200, 202, 204 of a first color, such as blue. For example, cylinder 180 has blue central segment 200. Cylinders in layer 24, include cylinders 186, 188, and 190, which have central segments 206, 208, 210 of a second color, such as green. For example, cylinder 188 has green central segment 208. Cylinders in layer 26, include cylinders 192, 194 and 196, which have central segments 212, 214, 216 of a third color, such as red. For example, cylinder 196 has red central segment 216. The orientation directions of these cylinders are indicated by arrows a, b, c, d, e, f, g, h, and j, respectively.

As before, a column is formed by a combination of one or more color regions that are superimposed. Thus, for example, the cylinders 180, 186 and 192 which are in the same rectangular columnar portion of sheet 20 form column 64. Similarly, the cylinders 182, 188 and 194 which are in the same rectangular columnar portion of sheet 20 form column 66, and the cylinders 184, 190 and 196 which are in the same rectangular columnar portion of sheet 20 form column 68.

Figure 17:
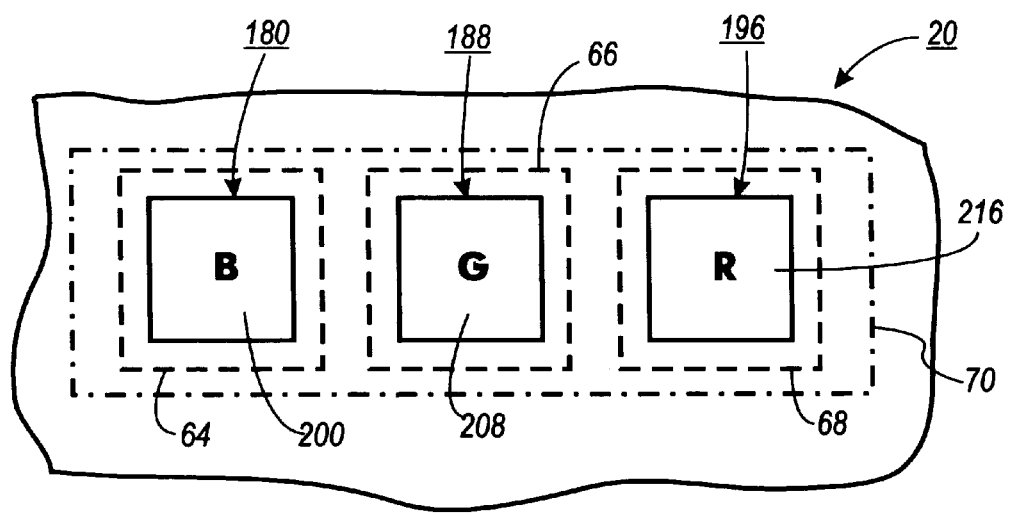
FIG. 17 shows a top view of the gyricon sheet shown in FIG. 16.

FIG. 17 illustrates a top view of the elastomer sheet 20 and the three columns 64, 66, 68 shown in FIG. 16 from the perspective of the observer at 1. The central portion of one cylinder in each column is visible to the observer at 1. This is because the cylinders 180, 188, and 196 all are oriented with their central segments 200, 208, 216 facing an observer at 1, so that full color saturation obtains for the red, green, and blue components, respectively. The cylinders 182, 184, 186, 190, 192, 194 all are oriented with their central segments edge-on with respect to an observer at 1, so that all these spheres look substantially transparent. Accordingly, column 64 appears substantially blue, column 66 appears substantially green, and column 68 appears substantially red.

A pixel 70 is formed from at least three adjacent columns such as columns 64, 66, and 68 as shown in FIG. 17.

While the foregoing examples of RGB gyricons are an improvement over previous RGB gyricons and can display a larger color gamut they still have a somewhat limited color gamut. Specifically, black is not available and white is available only by displaying all three colors, that is displaying red, green and blue components simultaneously. Several variations of the RGB gyricon of this invention described above are available for making black available and/or improving the white as shown in FIGS. 18–21. As will be apparent to those skilled in the art, these variations are suitable for use in reflective mode, that is, for gyricons of the present invention which are to be viewed in ambient light. In the cases of FIGS. 19 and 21, a combination of active back lighting and ambient light can also be used.

Note that for all of these variations, the sheets can, as before, be fabricated separately and need not be aligned either with the addressing electrodes or with one another, so long as the constraint of at least on element per color per subpixel is met. However, for ease of understanding, the sheets are depicted in FIGS. 18–21 as being aligned with a single element per column, similarly to FIG. 2.

Figure 18:
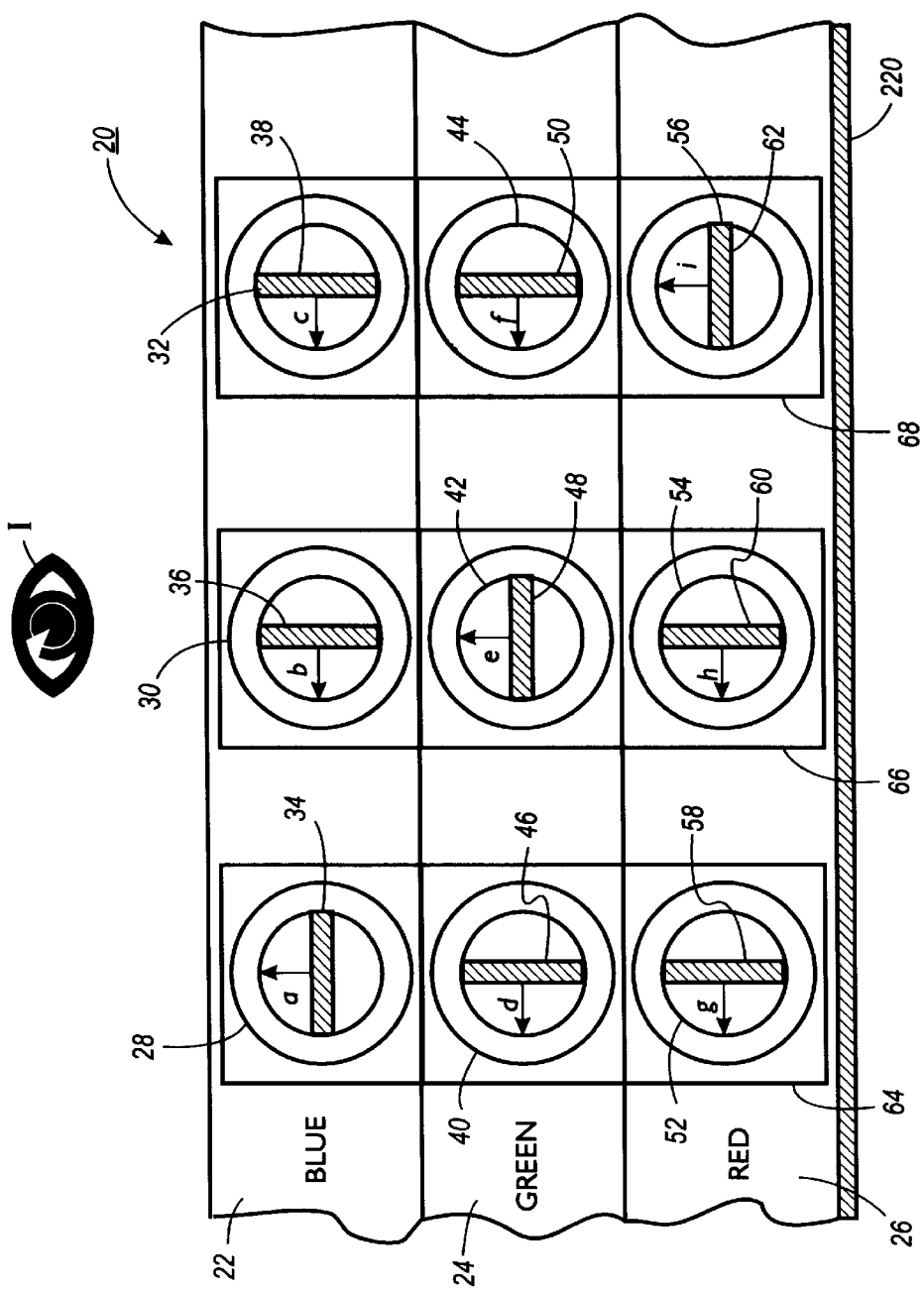
FIG. 18 shows a side view of a first alternate embodiment of a gyricon sheet of the present invention.
Figure 19:
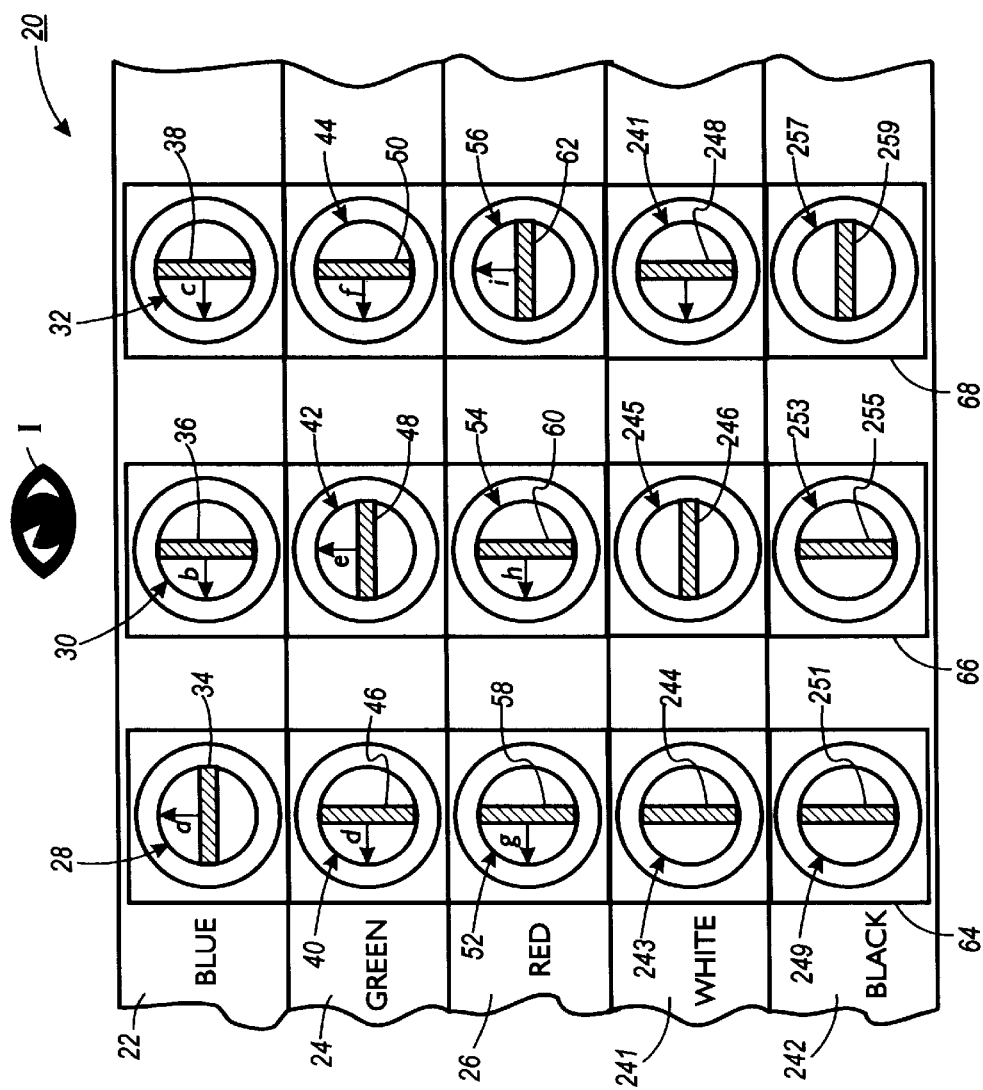
FIG. 19 shows a side view of a second alternate embodiment of a gyricon sheet of the present invention.

FIG. 18 shows the basic RGB gyricon of FIG. 2 with the addition of an opaque backing sheet 220. The opaque backing sheet 220 can be black, white, or in fact any color desired as a background color. Indeed, backing sheet 220 can have a pattern of colors, or even a graphic or an image, such as a map. The opaque backing sheet 220 becomes visible when all of the spheres in a given subpixel are turned such that their center segments are oriented edge-on with respect to the observer at 1, as for example spheres 30, 42, 54 as shown in column 66. Also, if the center segments of the RGB spheres are transmissive rather than opaque, and the opaque backing sheet 220 is white of a color or colors that reflect light well (i.e. not black), the backing sheet 220 will be visible through a transmissive color overlay provided by the RGB layers.

Though the approach of FIG. 18 is a simple one, it has the disadvantage that only one additional color (or, at best a fixed background scheme) can be added. Also, there may be durability issues associated with applying a backing sheet 220 to a gyricon sheet 20.

Another approach for adding more directly displayable colors to a gyricon sheet is to add one or more layers to the gyricon sheet. FIG. 19 shows the basic RGB gyricon of FIG. 2 with two additional layers added. In this case, layers 241 and 242 have been added to supply white and black. Layer 241 contains spheres 243, 245, 247 whose opaque center segments 244, 246, 248 are white. Layer 242 contains spheres 249, 253, 257 whose opaque center segments 251, 255, 259 are black. Subpixels 64, 66, 68 are now composed of a set of five spheres, one for each of the colors red, green, and blue plus one each for black and white. In operation these additional layers of spheres work in the same manner as the RGB sphere layers described above. Also, the additional layers need not be limited to black and white, but can be any color desired by the user, including custom colors for company logos and the like. The center segments of the spheres in the RGB layers can be opaque or transmissive, in the latter case, the RGB image provided by the RGB layers can appear as an overlay on the black-and-white image provided by the additional layers when the gyricon is viewed in ambient light, or as a transmissive image if the gyricon is backlit with the white and black spheres turned with their center segments turned edge-on towards an observer at 1.

This embodiment of FIG. 19, has the advantage of providing more color flexibility than using a colored backing sheet. However, the additional layers add complexity to the gyricon sheet 20 and possibly to the addressing mechanism as well, which for some applications may not be desired. Also, the additional layers may cut down on the brightness of the display, because the light must travel through a thicker sheet.

Figure 20:
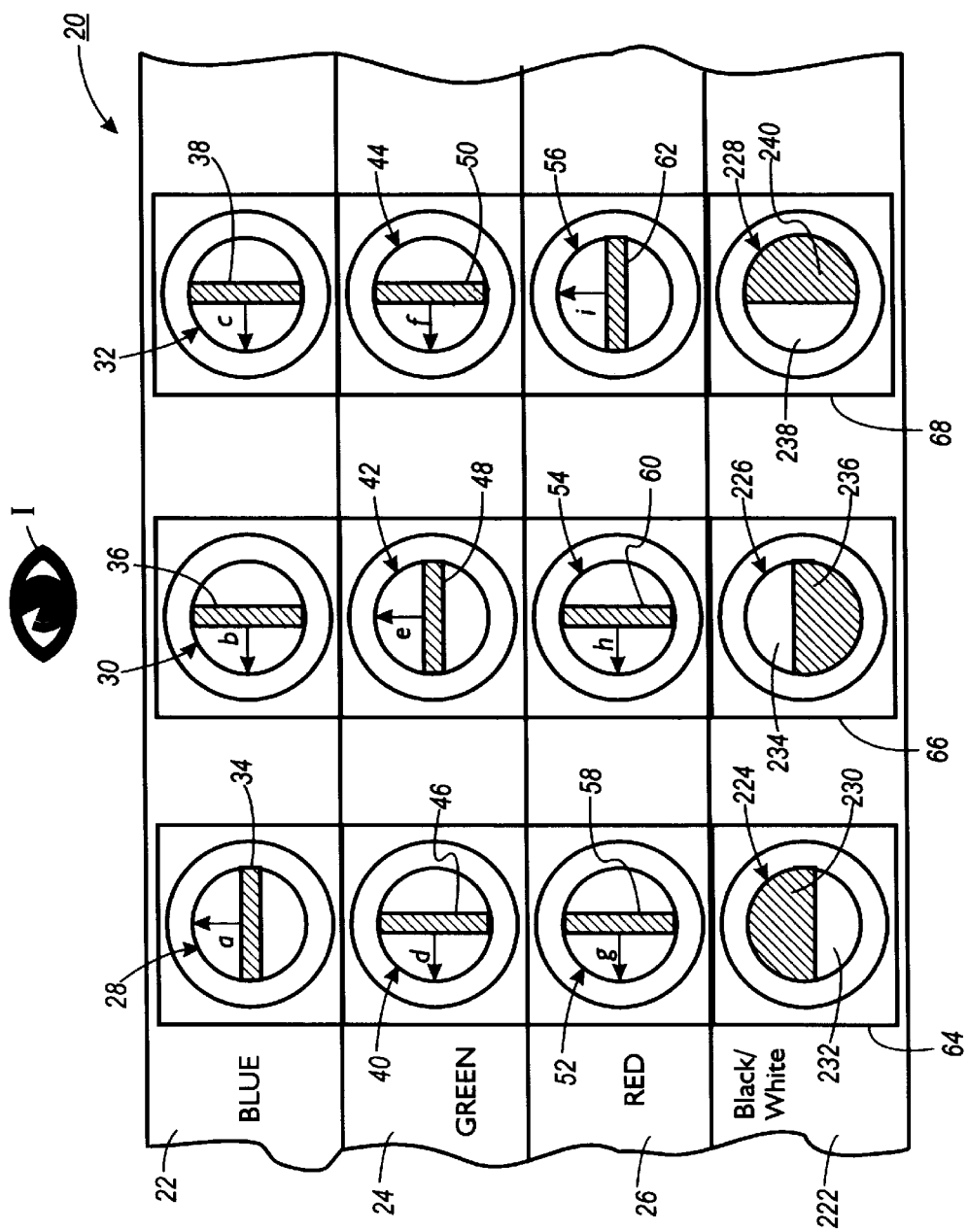
FIG. 20 shows a side view of a third alternate embodiment of a gyricon sheet of the present invention.
Figure 21:
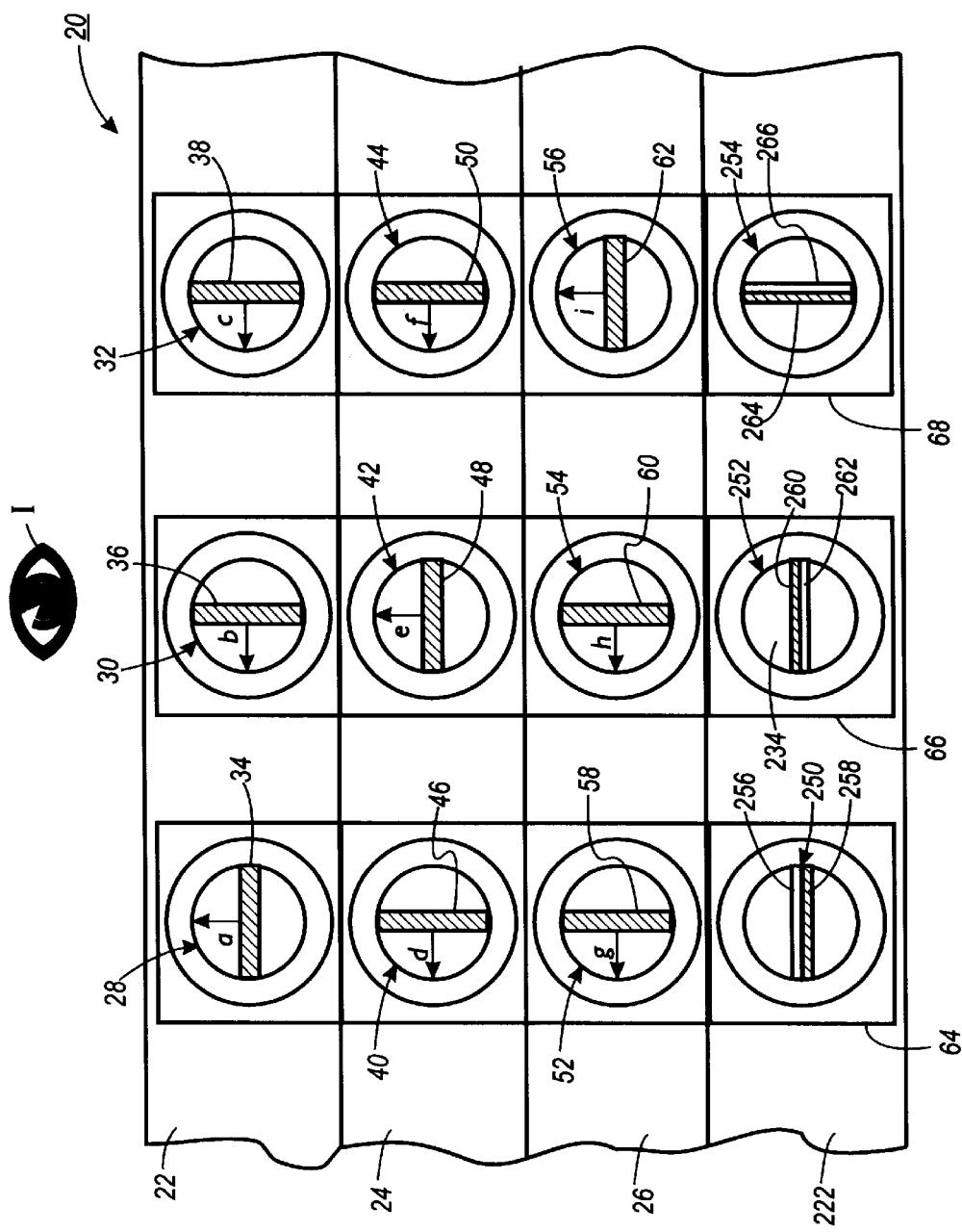
FIG. 21 shows a side view of a fourth alternate embodiment of a gyricon of the present invention.

A third approach is shown in FIG. 20, in which an additional layer 222 of bichromal spheres 224, 226, 228 has been added to the RGB sheet of FIG. 2. Each sphere 224, 226, 228 has two hemispherical colorations. In this case, for example, sphere 224 is shown colored white on one hemisphere 232 and black on the other hemisphere 230. Each subpixel 64, 66, 68 is now comprised of three spheres which have center sections of different colors (either opaque, or transmissive as for an RGB overlay on a black-and-white background image) and an opaque bichromal sphere. The opaque bichromal sphere can be seen by observer at 1 when the three spheres above it are turned such that their center sections are turned edge-on to the observer at 1, such as illustrated by sphere 30, 42, 54 as shown in column 66. The opaque bichromal sphere can be viewed in three orientations illustrated by the three spheres 224, 226, 228. When the opaque bichromal sphere 224 is viewed with the black 230 hemisphere towards the observer then black will be shown. The opaque bichromal sphere 226, is shown in the reverse orientation with a white 234 hemisphere being viewed. The opaque bichromal sphere 228, however, is oriented such that the junction of the black 240 and white 238 hemispheres is oriented towards the observer. In this case, the subpixel 68 will appear grey. This can be useful in providing better grey scale resolution in the gyricon sheet 20. Grey scale mixing can be accomplished by selecting each individual subpixel to display either full black, full white or grey without a significant increase in electrode or driver circuit complexity beyond what is already required for the remaining layers. Of course, the rotation and selection circuitry can be simplified to provide only the black and white states if that is all that is required.

A fourth approach is shown in FIG. 21, in which an additional layer 222 of bichromal spheres 250, 252, 254 has been added to the RGB sheet of FIG. 2. This approach differs from that shown in FIG. 20 in that each sphere 250, 252, 254 has two adjacent, thin central disks, each with a different coloration. A complete description, including manufacturing techniques for such spheres, has been disclosed in U.S. Pat. No. 5,717,514, by Sheridon, issued Feb. 10$^{th}$, 1998, titled "Polychromal Segmented Balls For A Twisting Ball Display", and U.S. Pat. No. 5,737,115, by Mackinlay et al., issued Apr. 7, 1998, titled "Additive Color Tristate Light Valve Twisting Ball Display," both incorporated by reference hereinabove. For instance, sphere 250 has central disks 256, 258 which are white and black, respectively; sphere 252 has two central disks 260, 262 which are black and white, respectively; sphere 254 has two central disks 264, 266 which are black and white, respectively. Each subpixel 64, 66, 68 is now comprised of three spheres which have (opaque or transmissive) center sections of different colors plus a sphere which has an opaque bichromal center section that is, a center section composed of two colors. The bichromal sphere can be seen by observer at 1 when the three spheres above it are turned such that their center sections are turned edge-on to the observer at 1, as is illustrated by spheres 30, 42, 54, as shown in column 66. The spheres 250, 252, 254 can be viewed in three orientations illustrated in FIG. 21. When the sphere 250 is viewed with the white central disk 256 oriented towards the observer then white will be shown. The sphere 252 is shown in the reverse orientation with a black central disk 260 being viewed. The sphere 254, however, is oriented such that the black central disk 264 and the white central disk 266 are edge-on to the observer. In this case, just as with sphere 40, the sphere 254 will appear substantially transparent. As in the gyricon of FIG. 19, the center segments of the spheres of the RGB layers of FIG. 21 can be opaque or transmissive, with the latter being useful for overlay and backlit applications.

An advantage of the embodiment shown in FIG. 21 is that it can be combined with an opaque backing material (as previously shown in FIG. 18) for use in ambient light to add three additional colors with only an increase of one layer in the gyricon sheet. However, as compared with other embodiments, manufacture of the spheres containing two central segments can be more complicated.

The use of spheres comprising two very thin, adjacent central segments can be expanded in the present invention, as discussed hereinbelow with reference to FIG. 22, leading to an overall decrease in the number of layers required. Although the construction of the spheres may be more complicated, the overall decrease in the number of sheet layers needed to construct the gyricon can be expected to have beneficial effects, such as an increase in brightness because light passes through fewer layers.

Figure 22:
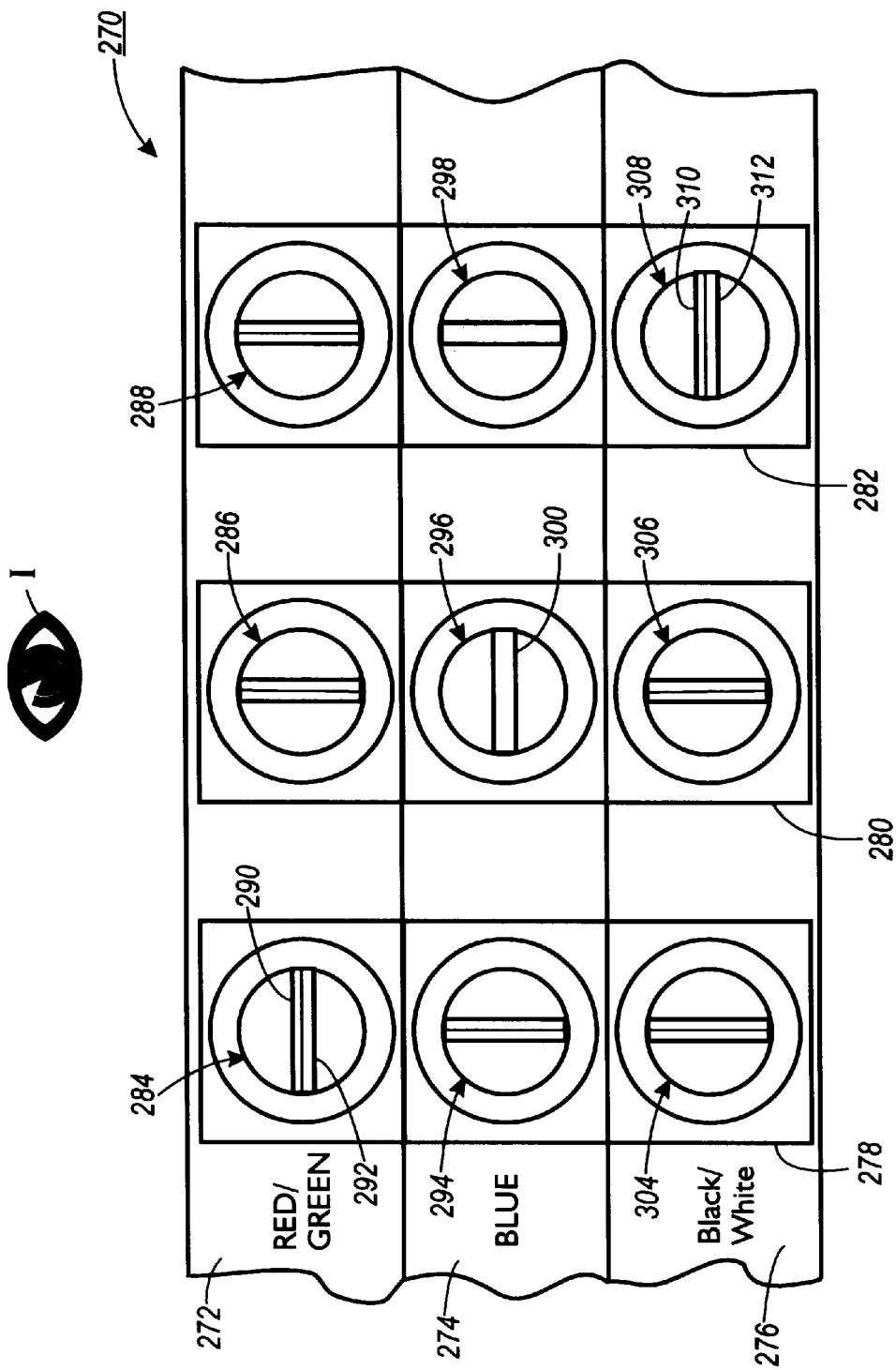
FIG. 22 shows a side view of a fifth alternate embodiment of a gyricon of the present invention.

FIG. 22 illustrates a side view of a portion of an elastomer sheet 270 from an RGB gyricon with an observer at 1. Sheet 270 has three layers 272, 274, 276. Sheet 270 in FIG. 22 is very similar to sheet 20 shown in FIG. 2 with an important difference: Two layers of the sheet (here, layers 272 and 276) are made of spheres each having two thin, central segments. However, all the previously described concepts, including techniques for sheet manufacturing, addressing, gyricon operation, sphere alignment or lack thereof, extended color gamut, and achieving good areal coverage (including substituting cylinders for spheres) are all directly applicable to this embodiment as they are to the embodiment shown in FIG. 2. Spheres in layer 272 include spheres 284, 286, and 288, which have two central segments each, as exemplified by sphere 284 with two thin central segments 290 and 292, which are red and green, respectively. Spheres in layer 274 include spheres 294, 296, and 298, which have one central segment each, as exemplified by sphere 296 with central segment 300, which is blue. Spheres in layer 276 include spheres 304, 306, and 308, which have two central segments each, as exemplified by sphere 308 with two thin central segments 310 and 312, which are black and white, respectively.

A column is formed by a combination of one or more color regions that are overlaid. Thus, for example, the spheres 284, 294, and 304, which are in the same rectangular columnar portion of sheet 270, form column 278. Similarly, the spheres 286, 296, 306 which are in the same rectangular columnar portion of sheet 270 form column 280, and the spheres 288, 298, and 308 which are in the same rectangular columnar portion of sheet 270 form column 282.

A pixel is again formed from at least three adjacent columns such as columns 278, 280, and 282. This is due to the way color is mixed in an RGB system. Colors other than red, blue, or green are "mixed" in an additive system, by relative densities of adjacent red, blue and green components in a given pixel. For example, a pixel which shows ⅓ blue, ⅓ green, and ⅓ red will be perceived by the eye as white. Only one color is viewed in a column at a time. Therefore, in order to provide all component colors to allow for proper color mixing, a pixel must contain at least one column for each component color. In practice an RGB gyricon is likely to have many columns for each component color in each pixel. Nevertheless, the one-column-per-color arrangement illustrated here is also possible, and provides an easily understood example for purposes of discussion.

In this simplified embodiment, each column 278, 280, and 282 forms a subpixel and a color is viewable in a column when a sphere is rotated such that one of the thin central segments is oriented towards the observer at 1. For example, in column 278 sphere 284 is rotated such that the red central segment 290 is oriented towards the observer at 1 while spheres 294 and 304 are oriented such that the central segments in each of them are oriented edge-on to observer at 1. Observer at 1 will view red in column 278. In column 280 sphere 296 is oriented such that the blue central disk 300 is oriented towards the observer at 1 while spheres 286 and 306 are oriented such that the central segments in each of them are oriented edge-on to observer at 1. Observer at 1 will view blue in column 280, sphere 286 will appear substantially transparent. In column 288 sphere 308 is oriented such that the black central disk 310 is oriented towards the observer at 1 while spheres 288 and 298 are oriented such that the two central segments in each of them are oriented edge-on to observer at 1. The observer at 1 will view black in column 282, while spheres 288 and 298 will appear substantially transparent. The pixel composed of the three columns 278, 280, 282 will be viewed by the observer at 1 as ⅓ red, ⅓ blue, and ⅓ black and will appear to be a dark magenta.

As can be readily appreciated, a pixel can be selected to show any combination of red, green, blue, black or white simply by orienting the central disks of the appropriate spheres towards the observer at 1 while orienting the remaining spheres such that their central disks are edge-on to the observer at 1. At the cost of additional complexity in the fabrication of the spheres, an additive color gyricon has been described which has the full color gamut described with respect to FIG. 2 plus black and white while still only using three layers. It will also be appreciated that if the layer 274, using a single central segment, is replaced by a layer also using two central segments then an additional color can be added at no extra "layer" cost to the gyricon. Choices for the additional color might include custom colors to be used for highlighting, logos and the like. It will also be appreciated that a full color additive gyricon can be constructed in two layers by using only layers 272, 274 to provide red, green, and blue, as shown in FIG. 22, and omitting layer 276. Alternatively, by using layer 272 to provide red and green while using a second layer configured as in layer 272 or 276 with two thin central segments to provide blue and black, a two layer additive gyricon can be provided with black.

Stochastic Additive Color Gyricon

Several embodiments have been described which use multiple gyricon layers wherein each layer contains one type of rotatable spheres and the layers are overlaid on each other to provide an easier-to-manufacture additive color gyricon. Each of the layers can be manufactured separately from the others and may contain one of several types of rotating elements, including spheres or cylinders of several variations. The layers may be addressed individually using an addressing apparatus for each layer or they may be addressed sequentially using a single addressing apparatus for all the layers. When the additive color gyricon of the present invention is constructed using separate sheets, the sheets need not be aligned with each other nor with the addressing apparatus.

Although the ability to construct an additive color gyricon without the necessity of precise placement of rotating elements or the need to carefully align differing layers is of benefit, each of these embodiments requires more than one layer. Each additional layer used reduces certain desirable characteristics, such as brightness, of the gyricon. Therefore, it would be desirable find a means of making a full color gyricon that does not require precise placement of rotating elements, yet nevertheless can be made using a single sheet or layer of rotating elements.

Figure 23:
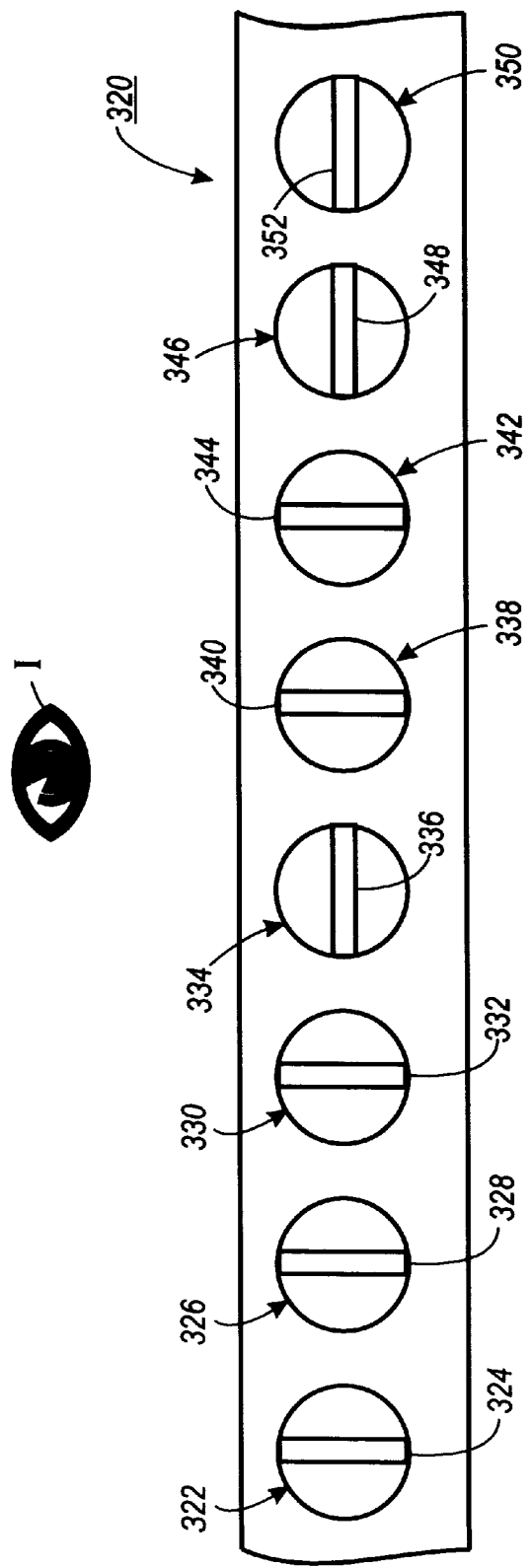
FIG. 23 shows a side view of a stochastic gyricon sheet of the present invention.

FIG. 23 shows a side view of a gyricon sheet 320 containing a random mixture of rotatable spheres 322, 326, 330, 334, 338, 342, 346, 350 visible to an observer at 1. Each of the spheres 322, 326, 330, 334, 338, 342, 346, 350 is of the general type described hereinabove with respect to FIG. 1. However, unlike the previous embodiment, the central disks of the spheres 322, 326, 330, 334, 338, 342, 346, 350, although contained in one layer, are not all the same color. For instance, the central disks 336, 348, and 352 of spheres 336, 346, and 350, respectively, may all be green while the central disks 324, 332 and 344 of spheres 322, 330, and 342, respectively, may be red and central disks 328 and 340 of spheres 326 and 338, respectively, may be blue.

Figure 24:
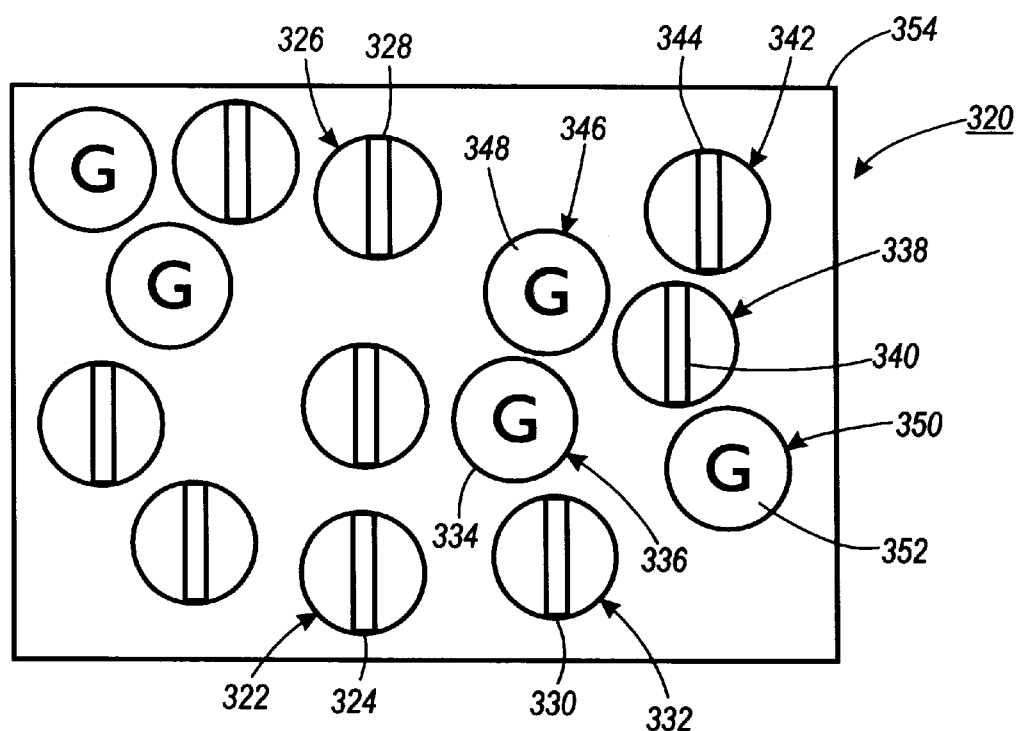
FIG. 24 shows a top view of the gyricon sheet from FIG. 23.

FIG. 24 shows a top view of a pixel 354 in sheet 320, from the perspective of observer at 1, utilizing the same spheres 322, 326, 330, 334, 338, 342, 346, 350. The central disks 336, 348, and 352 of spheres 334, 346, and 350, respectively, have been oriented to face the observer at 1, and so those spheres appear green. The central disks 324, 332 and 344 of spheres 322, 330, and 342, respectively, and the central disks 328 and 340 of spheres 326 and 338, respectively, have been oriented to be edge-on to the observer at 1 and so appear to be substantially transparent. The pixel 354 will appear substantially green.

Should it be desired to add additional colors, for instance black or white, then additional rotational elements can be added, such that for instance there are four populations of spheres where the fourth population has a central disk of opaque black. Furthermore, the techniques discussed herein above with respect to the layered devices, such as the addition of backing sheets or layers containing additional colors are also applicable to the stochastic device for extending the displayable range of colors.

Figure 25:
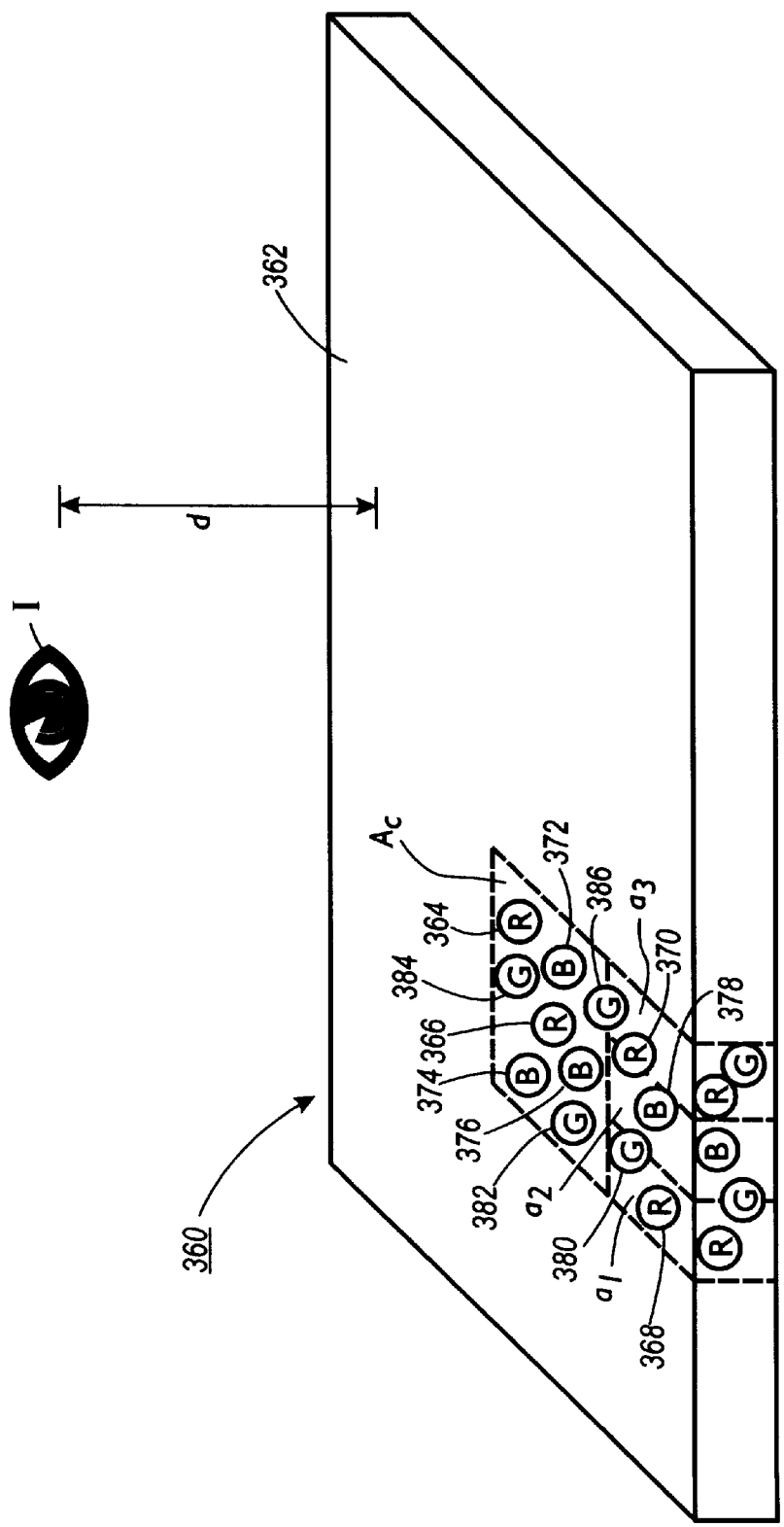
FIG. 25 shows a perspective view of a stochastic gyricon sheet of the present invention.

FIG. 25 shows a perspective view of a sheet 360 having a characteristic scale area $A_c$. Also shown are smaller areas $a_1$, $a_2$, and $a_3$ included in $A_c$. The characteristic scale area $A_c$ of a stochastic additive color gyricon sheet 360 is defined as an area of sufficient size (that is, sufficient areal extent) such that an observer at 1 situated favorably to view the sheet surface 362 from a distance d will observe that over viewing areas, which are at least as large as the characteristic scale area $A_c$, the color distribution of the rotational elements appears to be substantially uniform with respect to the surface, while over viewing areas that are smaller than the scale area $A_c$, the variations in the color distribution of the rotational elements begin to become apparent, and tend to become increasingly so as smaller and smaller viewing areas are considered. Put another way, the characteristic scale area $A_c$ is the minimum area over which the gyricon sheet 360 can be used to display all three solid colors (e.g., red, green, blue) and that appears substantially uniform to the observer at 1. All three substantially solid colors may be displayed because over this characteristic scale, the stochastic variations in color distributions tend not to be noticeable (or at least not objectionable) to the observer. This is due to the presence of approximately equal numbers of all three element types. Small variations in the actual numbers of each element type present in the characteristic scale area will still produce acceptable visual output. However variations in color distributions are more readily perceptible at smaller scales because the area may contain very few, or none at all, of an element type. The distance d is a viewing distance typical of the particular application that is expected or intended for gyricon sheet 360. For example, d might be on the order of 6 to 12 inches if sheet 360 is to be used for a newspaper, or on the order of many yards if sheet 360 is to be used for a billboard.

As can be seen in FIG. 25, a region of sheet 360 having characteristic scale area $A_c$ includes an assortment of rotational elements distributed approximately uniformly and randomly with respect to the surface 362. In the illustrated example, there are four red rotational elements 364, 366, 368, 370, four blue elements 372, 374, 376, 378, and four green elements 380, 382, 384, 386. The distribution over the characteristic scale area $A_c$, is substantially similar to the distribution over like areas $A_c$ elsewhere in sheet 360 and over the rest of the sheet 360 as a whole. However, when looking at the smaller areas $a_1$, $a_2$, $a_3$, which are shown contained within the characteristic scale area $A_c$, it can be seen that the distribution of rotational elements in any one area $a_1$, $a_2$, $a_3$ is not only dissimilar to the distribution of rotational elements in the characteristic scale area $A_c$, but also the distribution in the other small areas $a_1$, $a_2$, $a_3$. That is, the distribution in the small areas $a_1$, $a_2$, $a_3$, which are smaller than the characteristic scale area $A_c$ do not contain similar numbers of each type of element and at least one of each element. The size of the characteristic scale area $A_c$ will depend on a variety of factors including viewing distance, visual acuity of the observer, acceptable amounts of color distortion, and size and packing density of rotational elements.

The characteristic scale area $A_c$ is important because it determines the minimum size of a subpixel (or of a pixel, if no subpixels are used—see below) to be addressed that will still maintain an acceptable visual quality of output. If the subpixel is made smaller than the characteristic scale area $A_c$, then color distortions will occur due to the nonuniformity of the rotational elements contained in the subpixel; e.g. a subpixel selected to be red may not appear red because it is lacking in sufficient red elements. To ensure a uniform appearance of the display, it is desirable for the subpixel area to be at least as large as the characteristic scale area $A_c$ and possibly much greater than the characteristic scale area $A_c$.

Color mixing in the stochastic additive color gyricon occurs in the same manner as described hereinabove. For instance, when the central disks of all the spheres are oriented towards the observer at 1, then the pixel will be approximately ⅓ green, ⅓ red, and ⅓ blue and will appear substantially white. In order to address pixel 354 multipass, multithreshold addressing techniques described fully in U.S. Pat. No. 5,739,801, by Sheridon, issued Apr. 14th, 1998, titled "Multithreshold Addressing Of A Twisting Ball Display" and herein incorporated by reference, must be used. To summarize, each type of sphere, for instance all the spheres 336, 346, and 350 having green central disks 336, 348, and 352, can be addressed using a specific threshold voltage. Each type of sphere requires a different threshold voltage from the other types of spheres. When a voltage is applied that is greater than a sphere types threshold voltage, that sphere type will be addressed. However, this means that the sphere type with the highest threshold voltage cannot be addressed without also addressing the other sphere types. Therefore multiple addressing passes must be used, addressing first those spheres with the highest threshold voltage and addressing last those spheres with the lowest threshold voltage.

The stochastic additive color gyricon can be addressed with conventional subpixel addressing, once again with no requirement that the addressing electrode grid be aligned with the gyricon sheet. Subpixels form wherever the individual electrode grid units happen to be. Moreover, each subpixel can produce all component colors, so the alternative addressing scheme for enhanced color gamut, as previously described hereinabove, can be used here as well.

Furthermore, with the stochastic additive color gyricon, it is even possible to dispense with subpixels altogether, and simply to provide pixels as the smallest addressable units. Each such pixel is capable of delivering all colors in the color gamut, so long as the pixel area is greater than or equal to the characteristic scale area $A_c$. However, to ensure a uniform appearance of the display, it is desirable that the pixel area be much greater than $A_c$.

I claim:
1. A gyricon sheet comprising:
   a) a substrate having two opposed surfaces and at least two layers wherein one of the surfaces is a viewing surface, and
   b) a collection of optically anisotropic light modulating elements capable of being made rotatable wherein each element is capable of producing at least two observable aspects to an observer favorably situated to observe the viewing surface wherein one aspect is being substantially optically transparent and the other aspect is associated with a first component color wherein at least some of said elements are associated with a first component color, at least some of said elements are associated with a second component color different from the first component color, and at least some of said elements are associated with a third component color different from both the first and second component colors, wherein the elements associated with one of the component colors are substantially contained in a different layer from the elements associated with the other component colors, and wherein the first, second, and third component colors are chosen such that when at least a portion of the elements associated with the first, second and third component colors are arranged to present the aspect associated with the component color to be observed simuftaneously by an observer situated favorably to observe the viewing surface the observer would approximately view white.

2. The gyricon sheet of claim 1 wherein the elements associate with the first and second component colors form a set of elements substantially contained in one layer wherein each element is capable of producing three observable aspects to an observer favorably situated to observe the viewing surface wherein one aspect is being substantially optically transparent, one aspect is associated with the first component color, and one aspect is associated with the second component color.

3. The gyricon sheet of claim 1 or claim 2 wherein the first, second and third component colors are chosen to be red, blue and green, respectively.

4. The gyricon sheet of claim 1 wherein the sheet has three layers, substantially all of the elements associated with a single component color are substantially contained within one layer, and wherein the elements associated with any one of the component colors are substantially contained in a different layer from the elements associated with the other component colors.

5. The gyricon sheet of claim 1 wherein the elements are rotatable.

6. The gyricon sheet of claim 1 wherein at least some of said elements are associated with a fourth component color different from all of the first, second, and third component colors.

7. The gyricon sheet of claim 6 wherein the elements associated with two of the component colors form a set of elements substantially contained in one layer wherein each element is capable of producing three observable aspects to an observer favorably situated to observe the viewing surface wherein one aspect is being substantially optically transparent, one aspect is associated with one of the component colors, and one aspect is associated with the other component color.

8. The gyricon sheet of claim 6 wherein the fourth component color is chosen from the set of black and white.

9. The gyricon sheet of claim 6 wherein at least some of said elements are associated with a fifth component color different from both the first, second, third, and fourth component colors.

10. The gyricon sheet of claim 6 wherein the elements associated with the fourth component color are also associated with a fifth component color different from all of the first, second, third, and fourth component colors and form a set of elements substantially contained in one layer which does not contain any elements associated with any of the other component colors, wherein each element is capable of producing three observable aspects to an observer favorably situated to observe the viewing surface, wherein one aspect is being substantially optically transparent, one aspect is associated with the fourth component color, and one aspect is associated with the fifth component color.

11. The gyricon sheet of claim 1 further comprising an additional set of elements substantially contained in one layer which does not contain any of the other elements wherein each element is capable of producing at least two observable aspects to an observer favorably situated to observe the viewing surface wherein one aspect is associated with a fourth component color and the other aspect is associated with a fifth component color wherein the fourth and fifth component colors are different from the first, second, and third component colors.

12. The gyricon sheet of either claim 10 or claim 11 wherein the fourth and fifth component colors are chosen to be black and white, respectively.

13. The gyricon sheet of claim 1 further comprising an opaque backing sheet adjacent to the surface that is not the viewing surface and is situated to be viewed by an observer situated favorably to observe the viewing surface when at least one element is arranged to present the aspect which is substantially optically transparent.

14. The gyricon sheet of claim 13 wherein the opaque backing sheet is selected to be viewed as a color and the color is chosen from the set of black and white.

15. The gyricon sheet of claim 1 wherein the elements produce the aspect associated with a component color by modulating at least some incident light.

16. The gyricon sheet of claim 15 wherein at least some of the elements modulate light by transmitting light.

17. The gyricon sheet of claim 15 wherein at least some of the elements modulate light by reflecting light.

18. The gyricon sheet of claim 1 wherein the viewing surface is capable of being divided into at least one area having an areal size with respect to the viewing surface wherein the area contains at least one element associated with each component color and approximately the same number of elements associated with each component color.

19. The gyricon sheet of claim 1 wherein the viewing surface is capable of being divided into a multiplicity of areas, each area having an areal size with respect to the viewing surface wherein the area contains at least one element associated with each component color and approximately the same number of elements associated with each component color.

20. The gyricon sheet of claim 1 wherein the viewing surface is capable of being divided into at least one area having an areal size with respect to the viewing surface wherein the area contains sufficient numbers of each element associated with each component color such that when they are arranged to present the aspect associated with the component color to be observed simultaneously by an observer situated favorably to observe the viewing surface the observer would approximately view white.

21. The gyricon sheet of either claim 18, 19, or 20 further comprising an addressing device having at least one addressable areal unit, the addressable areal unit being at least as large as the area of the viewing surface, the addressing device defining by virtue of its placement with respect to the viewing surface and actually addressed area having a boundary contiguous with that of the addressable areal unit of the addressing device.

22. The gyricon sheet of either claim 18, 19, or 20 further comprising an addressing device having at least one addressable areal unit, the addressable areal unit being at least as large as the area of the viewing surface, the addressing device defining by virtue of its placement with respect to the viewing surface and actually addressed area having a boundary contiguous with that of the addressable areal unit of the addressing device and the addressing device is removable.

23. The gyricon sheet of either claim 18, 19, or 20 further comprising an addressing device having at least one addressable areal unit, the addressable areal unit being at least as large as the area of the viewing surface, the addressing device defining by virtue of its placement with respect to the viewing surface and actually addressed area having a boundary contiguous with that of the addressable areal unit of the addressing device and the addressable areal unit is a unit cell of a rectilinear matrix.

24. The gyricon sheet of claim 1 wherein the portion of viewing surface is capable of being divided into at least one area having a minimum size wherein the distribution of elements in the area is substantially the same as the distribution of elements in the portion of the viewing surface.

25. The gyricon sheet of claim 1 wherein the elements are substantially spherical in shape.

26. The gyricon sheet of claim 1 wherein the elements are substantially cylindrical in shape.

27. A method of using a gyricon device comprising:

a) providing a light source having at least first, second, and third beams incident on a gyricon device having a substrate with two substantially parallel surfaces and containing at least two layers, wherein each layer comprises a plurality of optically and electrically anisotropic rotatable elements, at first, second, and third incidence locations, and b) modulating each of the first, second and third rays with an element contained within one layer of the gyricon device, and c) passing the first second, and third beams out of the gyricon device through a surface thereof substantially without further modulation from a modulating element situated in a different layer of the gyricon device such that a substantially full color gamut is provided while only modulating any one incident light beam by an element in any one layer.

* * * * *